US010354297B2

(12) United States Patent
Takayama et al.

(10) Patent No.: US 10,354,297 B2
(45) Date of Patent: Jul. 16, 2019

(54) INFORMATION PROCESSING APPARATUS, METHOD FOR GENERATING ELECTRIC POWER PRICE LIST, INFORMATION PROCESSING SYSTEM, AND DISPLAY DEVICE

(71) Applicant: Panasonic Corporation, Osaka (JP)

(72) Inventors: Hisashi Takayama, Osaka (JP); Yuki Waki, Osaka (JP); Tetsuya Kouda, Osaka (JP); Yasuo Yoshimura, Shiga (JP); Toshihisa Ikeda, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 1175 days.

(21) Appl. No.: 14/127,330

(22) PCT Filed: Dec. 10, 2012

(86) PCT No.: PCT/JP2012/007869
§ 371 (c)(1),
(2) Date: Dec. 18, 2013

(87) PCT Pub. No.: WO2013/094146
PCT Pub. Date: Jun. 27, 2013

(65) Prior Publication Data
US 2014/0136448 A1    May 15, 2014

(30) Foreign Application Priority Data

Dec. 21, 2011    (JP) ................................ 2011-280364

(51) Int. Cl.
*G06Q 30/02* (2012.01)
*G06Q 50/06* (2012.01)
(Continued)

(52) U.S. Cl.
CPC ..... *G06Q 30/0283* (2013.01); *G06Q 30/0206* (2013.01); *G06Q 50/06* (2013.01);
(Continued)

(58) Field of Classification Search
CPC .... G06Q 50/06; G06Q 10/06; G06Q 30/0206; G06Q 30/0283; H02J 2003/143; H02J 3/008; Y02B 70/3266; Y02B 70/325
See application file for complete search history.

(56) References Cited

U.S. PATENT DOCUMENTS

2006/0276938 A1* 12/2006 Miller ................... G06Q 50/06
700/295
2010/0174643 A1* 7/2010 Schaefer .............. G06Q 20/102
705/40

(Continued)

FOREIGN PATENT DOCUMENTS

CN    102484384    5/2012
JP    2004-194436    7/2004
(Continued)

OTHER PUBLICATIONS

TXU energy helps bring smart meters to life for customers across texas: Launches TXU energy MyEnergy DashboardSM. (Apr. 5, 2011). Business Wire Retrieved from https://dialog.proquest.com/professional/docview/860305223?accountid=142257 (Year: 2011).*
(Continued)

*Primary Examiner* — Michael P Harrington
(74) *Attorney, Agent, or Firm* — Wenderoth, Lind & Ponack, L.L.P.

(57) ABSTRACT

An electric power price information acquisition unit (114) acquires information related to an electric power purchase price, which is an electricity cost when an electronic device is operated using electric power supplied from a commercial power source, a price determination unit (100) determines,
(Continued)

for each time block, a generated power price which is an electricity cost when an electronic device is operated using generated power of a power generator for generating power using natural energy, and a stored power price which is an electricity cost when an electronic device is operated using electric power stored in an electric storage device, and a user price list generation unit (107) generates an electric power price list capable of displaying, with regard to an arbitrary time block, the electric power purchase price, the generated power price and the stored power price.

14 Claims, 26 Drawing Sheets

(51) Int. Cl.
*H02J 3/28* (2006.01)
*H02J 13/00* (2006.01)
*H02J 3/14* (2006.01)

(52) U.S. Cl.
CPC ............... *H02J 3/28* (2013.01); *H02J 13/001* (2013.01); *H02J 2003/146* (2013.01); *Y02B 70/3266* (2013.01); *Y04S 10/40* (2013.01); *Y04S 20/242* (2013.01); *Y04S 50/14* (2013.01)

(56) References Cited

U.S. PATENT DOCUMENTS

2012/0053739 A1\* 3/2012 Brian .................... G06F 1/3203
700/287
2012/0130558 A1 5/2012 Yoshimura

FOREIGN PATENT DOCUMENTS

| JP | 2008-2702 | 1/2008 |
| JP | 2008-21152 | 1/2008 |
| JP | 2010-16989 | 1/2010 |
| JP | 2010-233362 | 10/2010 |
| JP | 2011-87383 | 4/2011 |
| JP | 2011-092002 | 5/2011 |

OTHER PUBLICATIONS

Coalition announces major changes to smart meter program. (Dec. 15, 2011). Premium Official News Retrieved from https://dialog.proquest.com/professional/docview/911410821?accountid=142257 (Year: 2011).*

International Search Report dated Feb. 26, 2013 in International (PCT) Application No. PCT/JP2012/007869.

\* cited by examiner

FIG. 8

| | | | | | | |
|---|---|---|---|---|---|---|
| 1.9-2.0kWh | 20.2 | 36.5 | 36.5 | 36.5 | 36.5 | 36.5 |
| ⋮ | ⋮ | | ⋮ | | | |
| 0.4-0.5kWh | 20.2 | 36.5 | 36.5 | 36.5 | 36.5 | 36.5 |
| 0.3-0.4kWh | 20.2 | 36.5 | 36.5 | 36.5 | 36.5 | 36.5 |
| 0.2-0.3kWh | 20.2 | 36.5 | 17.5 | 17.5 | 17.5 | 0 |
| 0.1-0.2kWh | 20.2 | 36.5 | 17.5 | 0 | 0 | 0 |
| 0.0-0.1kWh | 20.2 | 17.5 | 0 | 0 | 0 | 0 |
| ELECTRIC POWER / TIME | 5:30-6:00 | 6:00-6:30 | 6:30-7:00 | 7:00-7:30 | 7:30-8:00 | 8:00-8:30 |

INFORMATION PROCESSING APPARATUS, METHOD FOR GENERATING ELECTRIC POWER PRICE LIST, INFORMATION PROCESSING SYSTEM, AND DISPLAY DEVICE

TECHNICAL FIELD

The present invention relates to an information processing apparatus which generates an electric power price list for displaying an electric power price when electric power supplied from a commercial power source is used, an electric power price when electric power generated by a power generator is used, and an electric power price when electric power stored in an electric storage device is used. The present invention also relates to a method for generating an electric power price list, an information processing system and a display device.

BACKGROUND ART

In recent years, a home energy management system for realizing energy conservation and cost reduction by introducing a power generator and a storage battery in a home and optimizing the operation of household electrical appliances has been proposed.

Moreover, also proposed is a system which changes the operating time of predetermined household electrical appliances to a time block with the highest cost benefit; that is, a time block with the lowest electricity cost.

For example, in Patent Literature 1, the total balance regarding all patterns of combinations of the operating start times of the respective electronic devices is calculated. Subsequently, the combination of the operating start times of the electronic devices which will maximize the total balance; that is, the electronic devices capable of obtaining the greatest profit, is extracted, and the extracted combination is set as a scheduling effect.

Moreover, in Patent Literature 2, the charging schedule of the storage battery is calculated so that charging is performed during a time block in which the unit price of the electricity charge is the most inexpensive, and the discharging schedule of the storage battery is calculated so that discharging is performed during a time block in which the unit price of the electricity charge is the most expensive.

Nevertheless, with a conventional system, there were cases where the operating time of the household electrical appliances was changed to an inconvenient time block for the user and, consequently, the user's convenience was impaired in certain cases.

For example, while it is likely that the scheduling effect obtained in Patent Literature 1 can obtain the greatest profit, it is also likely that the user's convenience will be impaired. Thus, it was difficult to create a schedule capable of achieving both the user's convenience and the user's profit.

Moreover, Patent Literature 2 determines whether to store, in the storage battery, the electric power that was generated by a solar power generator by comparing the unit price of buying and selling of the generated power and the electricity charge unit price for each time block. Thus, no particular consideration was given to the user's convenience, and it was difficult to create a charging schedule and a discharging schedule capable of achieving both the user's convenience and the user's profit.

CITATION LIST

Patent Literature

Patent Literature 1: Japanese Patent Application Publication No. 2008-21152
Patent Literature 2: Japanese Patent Application Publication No. 2010-233362

SUMMARY OF THE INVENTION

The present invention was devised in order to resolve the foregoing problems, and an object of this invention is to provide an information processing apparatus which generates an electric power price list capable of achieving both user's convenience and user's profit, method for generating an electric power price list, an information processing system and a display device.

The information processing apparatus according to an embodiment of the present invention comprises an acquisition unit for acquiring information related to an electric power purchase price, which is an electricity cost when an electronic device is operated using electric power supplied from a commercial power source, a price determination unit for determining, for each time block, a generated power price which is an electricity cost when an electronic device is operated using generated power of a power generator for generating power using natural energy, and a stored power price which is an electricity cost when an electronic device is operated using electric power stored in an electric storage device, and an electric power price list generation unit for generating an electric power price list capable of displaying, with regard to an arbitrary time block, the electric power purchase price, the generated power price and the stored power price.

According to the foregoing configuration, since an electric power price list capable of displaying an electric power purchase price, which is an electricity cost when an electronic device is operated using electric power supplied from a commercial power source, a generated power price which is an electricity cost when an electronic device is operated using generated power of a power generator for generating power using natural energy, and a stored power price which is an electricity cost when an electronic device is operated using electric power stored in an electric storage device is generated, the user can comprehend the time block in which the electricity cost can be further reduced by confirming the generated electric power price list. Thus, it is possible to generate an electric power price list capable of achieving both user's convenience and user's profit.

Note that, in addition to being realized as this kind of information processing apparatus, the present invention can also be realized as a method for generating an electric power price list including, as its steps, the characteristics means contained in the information processing apparatus, and can also be realized as a program for causing a computer to execute the foregoing characteristic steps.

Moreover, the present invention can also be realized as a voltage control system including the foregoing information processing apparatus.

According to this mode, since an electric power price list capable of displaying an electric power purchase price, which is an electricity cost when an electronic device is operated using electric power supplied from a commercial power source, a generated power price which is an electricity cost when an electronic device is operated using generated power of a power generator for generating power using natural energy, and a stored power price which is an electricity cost when an electronic device is operated using electric power stored in an electric storage device is generated, the user can comprehend the time block in which the electricity cost can be further reduced by confirming the generated electric power price list. Thus, it is possible to generate an electric power price list capable of achieving both user's convenience and user's profit.

The object, features and advantages of the present invention will become more apparent based on the ensuing detailed explanation and appended drawings.

BRIEF DESCRIPTION OF THE DRAWINGS

FIG. 8 is a diagram explaining the processing of generating a user price list in embodiment 1 of the present invention.

DESCRIPTION OF EMBODIMENTS

Embodiments of the present invention are now explained with reference to the appended drawings. Note that the following embodiments are merely examples that embody the present invention, and are not intended to limit the technical scope of the present invention. The numerical values, shapes, constituent elements, arrangement of constituent elements, mode of connection, order of steps and the like shown in the following embodiments are merely examples. Accordingly, the present invention is not limited by these respective modes. The present invention is limited only based on the scope of its claims. Thus, among the constituent elements in the following embodiments, the constituent elements that are not described in the independent claims that show the most significant concept of the present invention are not necessarily required to achieve the object of the present invention, and are explained as an example of an embodiment of the present invention.

Embodiment 1

Figure 1:
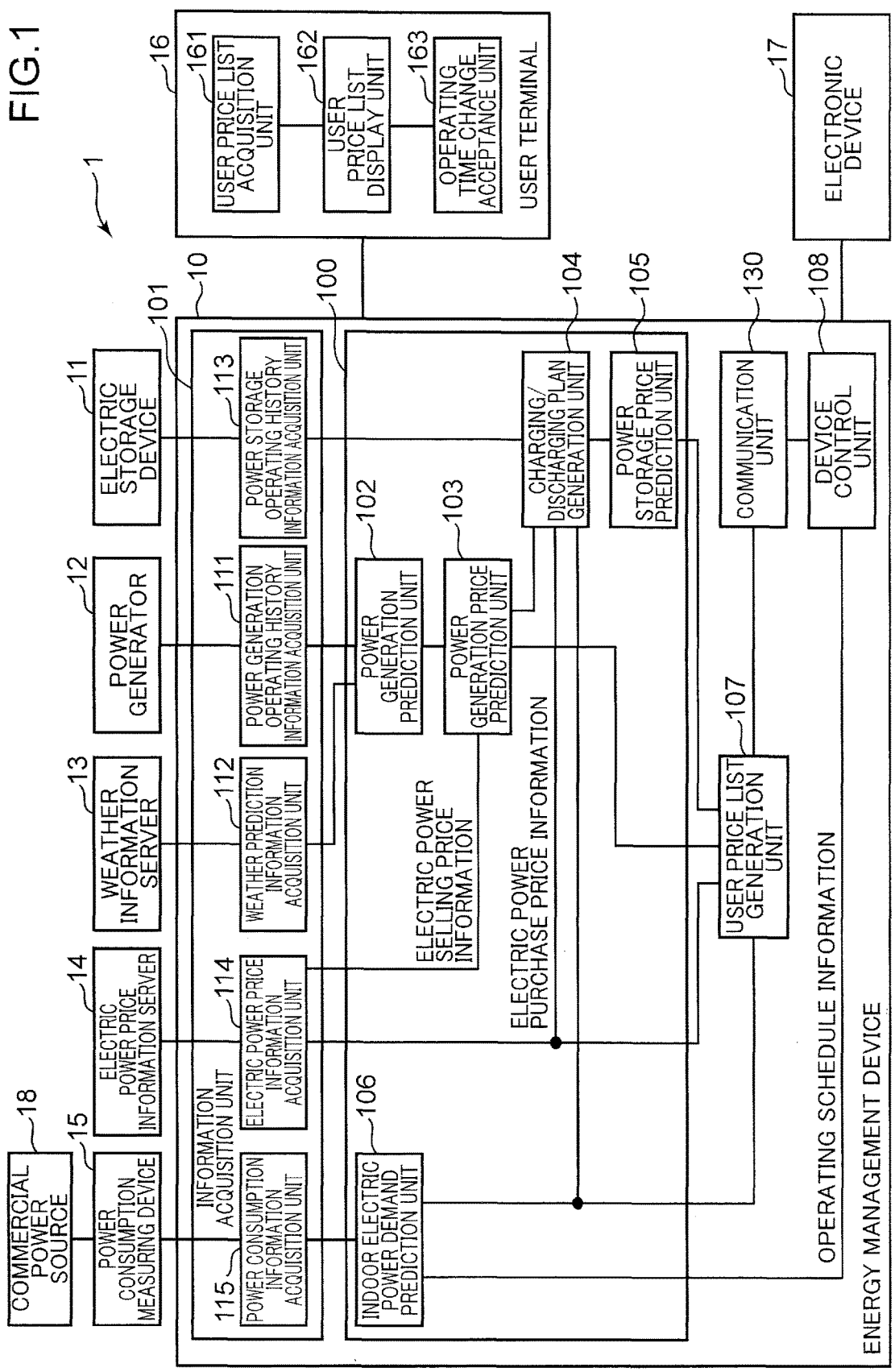
FIG. 1 is a diagram showing the configuration of the information processing system according to embodiment 1 of the present invention.

FIG. 1 is a diagram showing the configuration of the information processing system according to embodiment 1 of the present invention. The information processing system 1 shown in FIG. 1 comprises an energy management device 10, an electric storage device 11, a power generator 12, a weather information server 13, an electric power price information server 14, a power consumption measuring device 15, a user terminal 16 and an electronic device 17.

The commercial power source 18 is operated by an electric power company and supplies electric power to the respective households, and purchases electric power from the respective households.

The electric storage device 11 is disposed in a user's home, comprises a storage battery, and stores electric power in the storage battery. The electric storage device 11 stores, in the storage battery, the electric power supplied from the commercial power source 18 and the electric power generated by the power generator 12, and supplies, to the electronic device 17, the electric power stored in the storage battery.

The power generator 12 is disposed in a user's home, and generates power by using natural energy. The power generator 12 is configured, for example, from a solar power generator. The solar power generator comprises a solar panel for converting solar energy, which is natural energy, into electric power. The power generator 12 supplies, to the electronic device 17, the electric storage device 11 and the commercial power source 18, the electric power that was generated using natural energy. The power generator 12 supplies the electric power to the commercial power source 18 upon selling the electric power that was generated using natural energy.

The weather information server 13 stores weather prediction information, which is prediction of future weather, and sends the weather prediction information to the energy management device 10. Note that, preferably, the weather prediction information is, for example, information indicating the weather for each predetermined time on the following day, and information indicating the weather of every hour.

The electric power price information server 14 stores the electric power price information which indicates the price of the electric power that is supplied from the commercial power source 18, and sends the electric power price information to the energy management device 10. The electric power price information includes electric power purchase price information which indicates the price in the case of purchasing electric power from the commercial power source 18, and electric power selling price information which indicates the price upon selling electric power to the commercial power source 18. Note that the electric power purchase price information and the electric power selling price information indicate, for example, the price of every hour.

The power consumption measuring device 15 comprises a plurality of power sensors, and measures and stores the power consumption of the electronic device 17, and the electric power supplied from the commercial power source 18. The power consumption measuring device 15 sends, to the energy management device 10, the power consumption information indicating the measured power consumption.

The energy management device 10 and the electric storage device 11, the power generator 12, the weather information server 13, the electric power price information server 14, the power consumption measuring device 15, the user terminal 16 and the electronic device 17 are communicably connected to each other via a wireless or wired network.

The energy management device 10 comprises an information acquisition unit 101, a power generation prediction unit 102, a power generation price prediction unit 103, a charging/discharging plan generation unit 104, a power storage price prediction unit 105, an indoor electric power demand prediction unit 106, a user price list generation unit 107, a device control unit 108 and a communication unit 130.

The information acquisition unit 101 acquires information related to the electric power purchase price, which is an electricity cost when an electronic device is operated using electric power supplied from a commercial power source. The information acquisition unit 101 acquires the electric power purchase price upon purchasing electric power from the commercial power source 18, the electric power selling price upon selling electric power to the commercial power source 18, the operating history of the power generator 12 that generates power by using natural energy, the weather prediction information, and the operating history of the electric storage device 11 that stores electric power in the storage battery. Moreover, the information acquisition unit 101 acquires the use history (power consumption information) of electric power used by the respective electronic devices in a user's home.

The information acquisition unit 101 comprises a power generation operating history information acquisition unit 111, a weather prediction information acquisition unit 112, a power storage operating history information acquisition unit 113, an electric power price information acquisition unit 114 and a power consumption information acquisition unit 115.

The power generation operating history information acquisition unit 111 acquires, from the power generator 12, operating history information indicating the operating history of the power generator 12. The weather prediction information acquisition unit 112 acquires weather prediction information from the weather information server 13. The power storage operating history information acquisition unit 113 acquires, from the electric storage device 11, operating history information indicating the operating history of the electric storage device 11. The electric power price information acquisition unit 114 acquires electric power price information from the electric power price information server 14. The power consumption information acquisition unit 115 acquires power consumption information from the power consumption measuring device 15.

The power generation prediction unit 102 predicts the electric power generation, for each predetermined time block, of the power generator 12 by using the operating history information of the power generator 12 acquired by the power generation operating history information acquisition unit 111, and the weather prediction information acquired by the weather prediction information acquisition unit 112.

The power generation price prediction unit 103 generates a generated power operating plan, which is an operating plan of the electric power generated by the power generator 12, by using the electric power generation for each predetermined time block predicted by the power generation prediction unit 102, and the electric power selling price information contained in the electric power price information acquired by the electric power price information acquisition unit 114, and predicts, for each predetermined time block, the electric power price of the electric power usage of electric power that was generated by the power generator 12.

Here, a generated power operating plan is the plan for distributing electric power to the following three uses; namely, "use of the generated electric power by an electronic device", "selling of the generated electric power to the commercial power source 18", and "storage of the generated electric power in the electric storage device 11".

The indoor electric power demand prediction unit 106 predicts the indoor electric power demand of the electronic device 17 in a user's home by using the power consumption information acquired by the power consumption information acquisition unit 115. The indoor electric power demand prediction unit 106 predicts the indoor electric power demand of the following day, for example, based on the electric energy that was used on the same weekday in the past, or based on the electric energy that was used on that day.

The charging/discharging plan generation unit 104 generates an operation plan for the charging and discharging of the electric storage device 11 based on the operating history information of the electric storage device 11 acquired by the power storage operating history information acquisition unit 113, the electric power purchase price information contained in the electric power price information acquired by the electric power price information acquisition unit 114, the indoor electric power demand predicted by the indoor electric power demand prediction unit 106, and the allocation, to "storage of the generated electric power in the electric storage device 11", of the electric power generated based on the generated power operating plan generated by the power generation price prediction unit 103. Note that the charging/discharging plan generation unit 104 may also generate the operation plan of the electric storage device 11 by using only the operating history information of the electric storage device 11 acquired by the power storage operating history information acquisition unit 113. The charging/discharging plan generation unit 104 predicts the charging/discharging plan of the following day, for example, based on the operating history of the same weekday in the past, or the operating history of that day.

The power storage price prediction unit 105 predicts, for each predetermined time block, the electric power price when the electric power stored in the electric storage device 11 is used based on the electric power purchase price information contained in the electric power price information acquired by the electric power price information acquisition unit 114, the electric power price of the electric power generated by the power generator 12 which was predicted by the power generation price prediction unit 103, and the electric energy charged or discharged based on the charging/discharging plan of the electric storage device 11 which was generated by the charging/discharging plan generation unit 104.

Note that the price determination unit 100 is configured from a power generation prediction unit 102, a power generation price prediction unit 103, a charging/discharging plan generation unit 104, a power storage price prediction unit 105 and an indoor electric power demand prediction unit 106. The price determination unit 100 determines, for each time block, the generated power price which is the electricity cost upon operating the electronic device 17 by using the generation power of the power generator 12 which generates power using natural energy, and the stored power price which is the electricity cost upon operating the electronic device 17 by using the electric power stored in the electric storage device 11.

The user price list generation unit 107 generates a user price list which indicates, for each predetermined electric power usage and for each predetermined time block, the price of the electric power used by the electronic device 17 based on the electric power purchase price information contained in the electric power price information acquired by the electric power price information acquisition unit 114, the electric power price of the electric power generated by the power generator 12 which was predicted by the power generation price prediction unit 103, and the electric power price upon using the electric power stored in the electric storage device 11 which was predicted by the power storage price prediction unit 105.

Here, the user price list generation unit 107 generates the user price list by giving consideration to the allocation to "use of the generated electric power by an electronic device" of the electric power generated based on the generated power operating plan that was generated by the power generation price prediction unit 103, and the amount of discharge which indicates the charging/discharging plan that was generated by the charging/discharging plan generation unit 104.

The user price list generation unit 107 generates a user price list capable of displaying, with regard to an arbitrary time block, the electric power purchase price, the generated power price and the stored power price. The user price list generation unit 107 generates a user price list which indicates a time block that designates the most inexpensive price among the electric power purchase price acquired by the information acquisition unit 101, the generated power price predicted by the power generation price prediction unit 103, and the stored power price predicted by the power storage price prediction unit 105.

The user price list generation unit 107 generates a user price list which indicates, for each predetermined electric power usage and for each predetermined time block, the electric power price in a case of preferentially using a less expensive electric power among the electric power supplied from the commercial power source 18, the electric power generated by the power generator 12, and the electric power stored in the electric storage device 11.

In this embodiment, the electric power price of the electric power generated by the power generator 12 is the least expensive, the electric power stored in the electric storage device 11 is the second least expensive, and the electric power supplied from the commercial power source 18 is the third least expensive, and the electric power generated by the power generator 12, the electric power stored in the electric storage device 11, and the electric power supplied from the commercial power source 18 are preferentially used, in that order, by the electronic device 17.

In addition, the user price list generation unit 107 superimposes, on the user price list, the prediction result of the indoor electric power demand predicted by the indoor electric power demand prediction unit 106. Furthermore, the user price list generation unit 107 superimposed, on the user price list, together with the prediction result of the indoor electric power demand, the electric power required for operating a target electric device among the electronic devices in the user's home for which the operating time can be shifted, the operating time that the target electronic device is to be operated, and information indicating the target electronic device.

The communication unit 130 sends the user price list generated by the user price list generation unit 107 to the user terminal 16.

The device control unit 108 sends the control signal for controlling the electronic device 17 to the electronic device 17.

The user terminal 16 is configured, for example, from a portable phone, a personal computer or a display device, and comprises a user price list acquisition unit 161, a user price list display unit 162 and an operating time change acceptance unit 163.

The user price list acquisition unit 161 acquires the user price list created with the user price list generation unit 107 of the energy management device 10. The user price list acquisition unit 161 receives the user price list via a network. The user price list display unit 162 is configured, for example, from a liquid crystal display device, and displays the user price list acquired by the user price list acquisition unit 161. The user price list display unit 162 displays the user price list received by the user price list acquisition unit 161.

The operating time change acceptance unit 163 is configured, for example, from an operation button, a touch panel, a keyboard and a mouse, and accepts changes to the operating time of the electronic device 17. Among the electronic devices 17, there are electronic devices in which the operating time can be changed and electronic devices in which the operating time cannot be changed, and the user price list display unit 162 displays, in a distinguishable manner, the electric power usage of electronic devices in which the operating time can be changed. The operating time change acceptance unit 163 accepts changes to the operating time of the electronic devices 17 in which the operating time can be changed.

The operating time change acceptance unit 163 sends, to the energy management device 10, operating schedule information which indicates the operating time that was changed by the operating time change acceptance unit 163. The communication unit 130 receives the operating schedule information that was sent by the operating time change acceptance unit 163, and controls the electronic device 17 to change the operating time based on the operating schedule information received by the device control unit 108. Moreover, when the operating time of the electronic device 17 is changed, the user price list display unit 162 superimposes, on the user price list, together with the prediction result of the indoor electric power demand, information indicating the changed operating time of the electronic device 17 that was accepted by the operating time change acceptance unit 163.

Note that the user terminal 16 may also comprise an input unit for accepting an input on which electric power to use among the electric power from the commercial power source 18, the electric power of the power generator 12, and the electric power of the electric storage device 11 with regard to each time block from the electric power price list displayed on the user price list display unit 162, and a sending unit for sending, via the network, a notification signal for notifying the energy management device 10 of use of the electric power designated with the input unit. In the foregoing case, the input unit may detect which electric power to use based on a user's operation of a touch panel. Moreover, the input unit may detect which electric power to use by receiving an external signal sent from an external remote controller.

The electronic device 17 is, for example, a household electrical appliance such as a TV, refrigerator, washer/dryer, rice cooker, electric water heater or dishwasher. Note that the electronic device 17 is an electrical appliance that is used domestically, including sensors for measuring and detecting housing equipment and living environments. Moreover, while one electronic device 17 is connected to the energy management device 10 in FIG. 1, a plurality of electronic devices in a household are connected to the energy management device 10.

Moreover, among the above, the target electronic devices in which the operating time can be shifted are, for example, household electrical appliances such as a washer/dryer, a rice cooker, an electric water heater and a dishwasher.

Note that, in embodiment 1, the information acquisition unit 101 corresponds to an example of the acquisition unit, the power generation prediction unit 102 corresponds to an example of the power generation prediction unit, the power generation price prediction unit 103 corresponds to an example of the power generation price prediction unit, the charging/discharging plan generation unit 104 corresponds to an example of the operation plan generation unit, the power storage price prediction unit 105 corresponds to an example of the power storage price prediction unit, the user price list generation unit 107 corresponds to an example of the electric power price list generation unit, the indoor electric power demand prediction unit 106 corresponds to an example of the demand prediction unit, and the communication unit 130 corresponds to an example of the sending unit.

The simplified operation of the energy management device 10 according to embodiment 1 is now explained.

Figure 2:
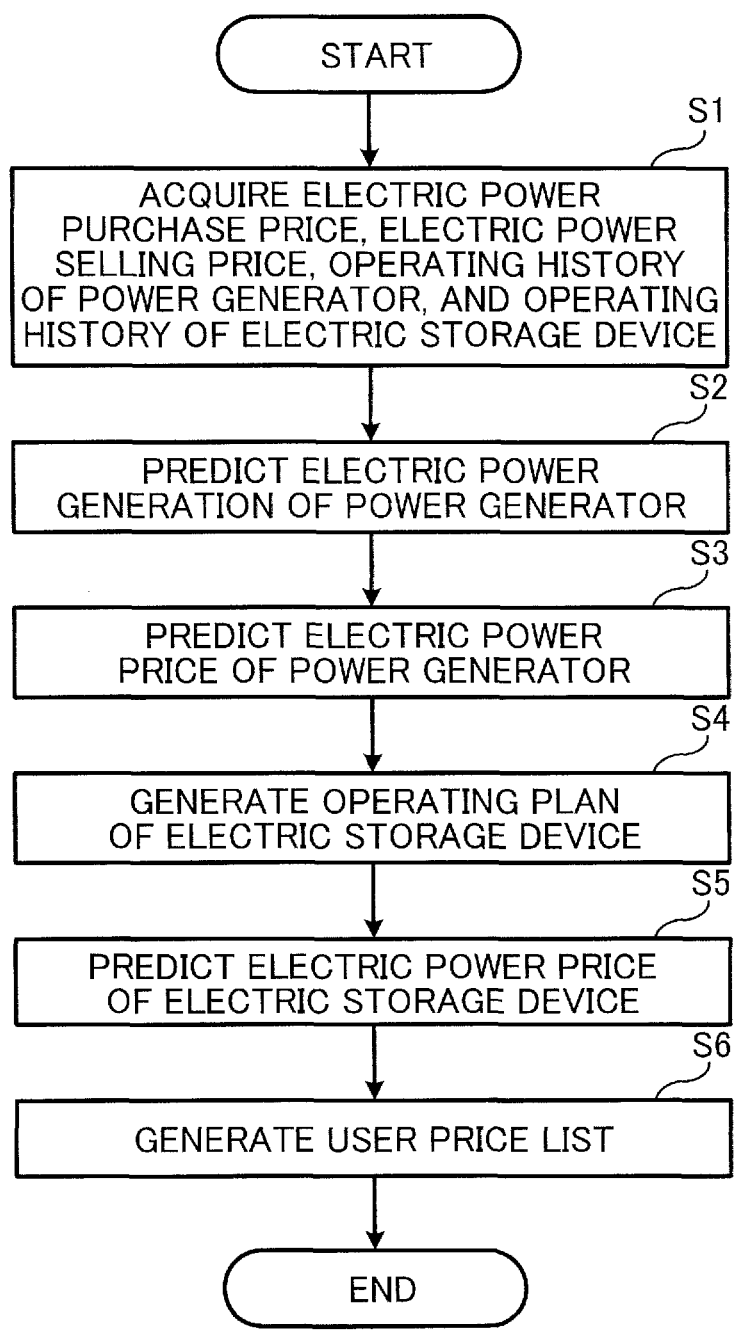
FIG. 2 is a flowchart explaining the simplified operation of the energy management device according to embodiment 1 of the present invention.

FIG. 2 is a flowchart explaining the simplified operation of the energy management device according to embodiment 1 of the present invention.

Foremost, in step S1, the information acquisition unit 101 acquires the electric power purchase upon purchasing electric power from the commercial power source 18, the electric power selling price upon selling electric power to the commercial power source 18, the operating history of the power generator 12 that generates power by using natural energy, the weather prediction information, and the operating history of the electric storage device 11 that stores electric power in the storage battery.

Subsequently, in step S2, the power generation prediction unit 102 predicts the electric power generation of the power generator 12 by using the operating history of the power generator 12 acquired by the information acquisition unit 101.

Subsequently, in step S3, the power generation price prediction unit 103 predicts, for each predetermined time block, the electric power price of the electric power usage of the electric power generated by the power generator 12 by using the electric power generation predicted by the power generation prediction unit 102.

Subsequently, in step S4, the charging/discharging plan generation unit 104 generates an operation plan of the electric storage device 11 by using the operating history of the electric storage device 11 acquired by the information acquisition unit 101.

Subsequently, in step S5, the power storage price prediction unit 105 predicts, for each predetermined time block, the electric power price of the electric power usage when the electric power stored in the electric storage device 11 is used based on the electric power purchase price information acquired by the information acquisition unit 101, the electric power price of the power generator 12 predicted by the power generation price prediction unit 103, and the electric energy charged or discharged to or from the electric storage device 11 based on the operation plan of the electric storage device 11 which was generated by the charging/discharging plan generation unit 104.

Subsequently, in step S6, the user price list generation unit 107 generates a user price list which indicates, for each predetermined electric power usage and for each predetermined time block, based on the electric power purchase price information acquired by the information acquisition unit 101, the electric power price of the electric power generated by the power generator 12 which was predicted by the power generation price prediction unit 103, and the electric power price upon using the electric power stored in the electric storage device 11 which was predicted by the power storage price prediction unit 105.

A more detailed operation of the information processing system 1 according to embodiment 1 is now explained.

Figure 3:
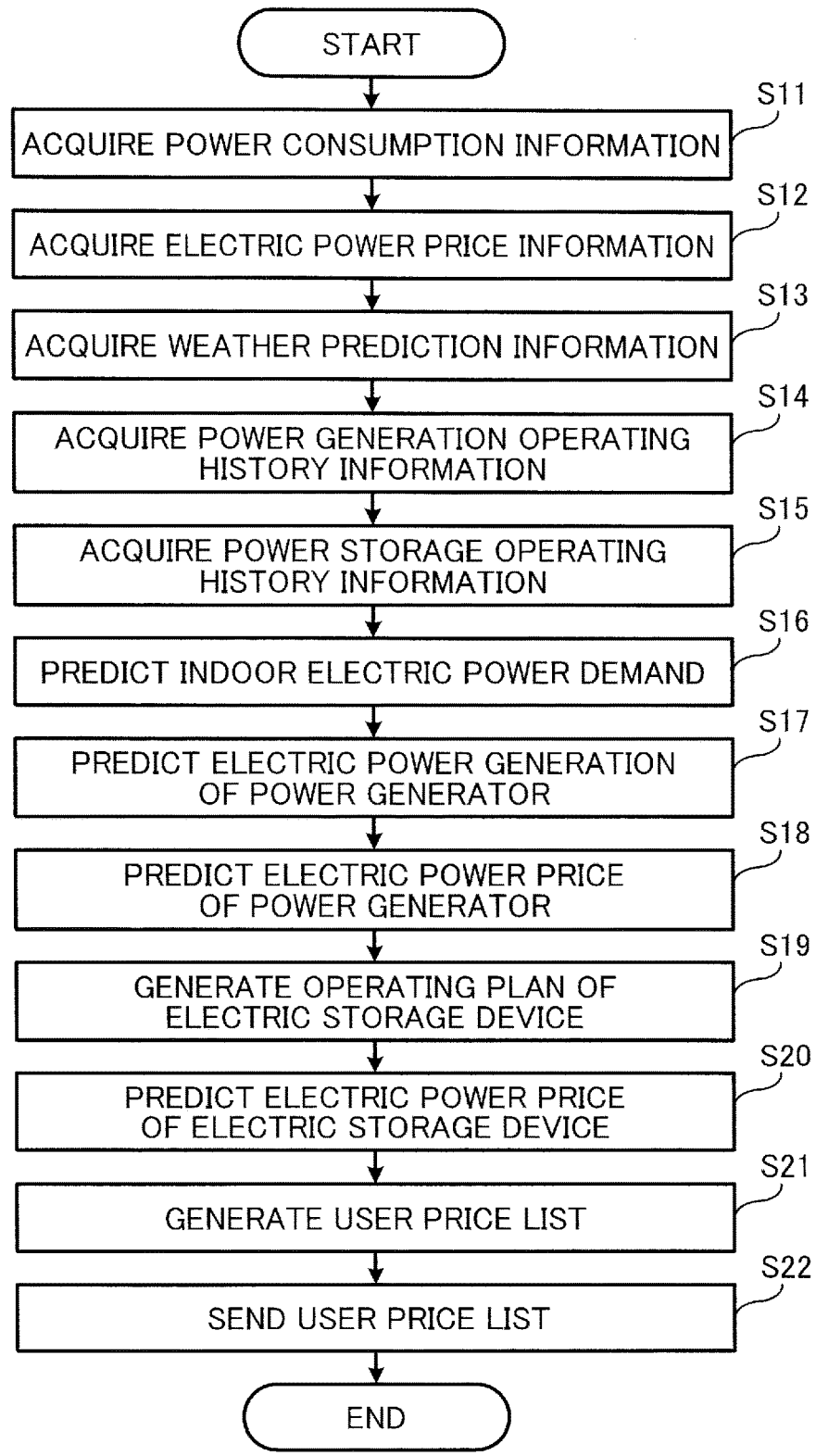
FIG. 3 is a flowchart explaining the detailed operation of the energy management device according to embodiment 1 of the present invention.

FIG. 3 is a flowchart explaining the detailed operation of the energy management device according to embodiment 1 of the present invention.

Foremost, in step S11, the power consumption information acquisition unit 115 acquires, from the power consumption measuring device 15, power consumption information which indicates the power consumption of the electronic device 17, and the electric power supplied from the commercial power source 18. Note that, in embodiment 1, the energy management device 10 starts the processing for generating the user price list, for example, at the start of each hour, and generates a user price list of 24 hours in the future. The power consumption information acquisition unit 115 acquires, for example, the power consumption information of the past 24 hours.

Note that, in embodiment 1, while the energy management device 10 starts the processing for generating the user price list at the start of each hour, the present invention is not limited thereto, and the processing may be started at an arbitrary time or started pursuant to a start command from the user. Moreover, in embodiment 1, while the energy management device 10 generates a user price list of 24 hours in the future, the present invention is not limited thereto, and the energy management device 10 may also generate a user price list of arbitrary hours from an arbitrary time. Moreover, the power consumption information acquisition unit 115 may also acquire the power consumption information of the past arbitrary houses from an arbitrary time.

Subsequently, in step S12, the electric power price information acquisition unit 114 acquires, from the electric power price information server 14, electric power price information containing the electric power purchase price information which indicates the price in the case of purchasing electric power from the commercial power source 18, and electric power selling price information which indicates the price upon selling electric power to the commercial power source 18. The electric power price information acquisition unit 114 acquires the electric power price information, for example, every hour of 24 hours in the future. Note that the electric power price information acquisition unit 114 may also acquire the electric power price information of arbitrary hours in the future from an arbitrary time.

Subsequently, in step S13, the weather prediction information acquisition unit 112 acquires, from the weather information server 13, the weather prediction information, which is prediction of future weather. The weather prediction information acquisition unit 112 acquires the weather prediction information, for example, every hour of 24 hours in the future. Note that the weather prediction information acquisition unit 112 may also acquire the weather prediction information of arbitrary hours in the future from an arbitrary time. Note that the weather prediction information includes, in addition to weather of the future (following day), history of past weather, and may also include the sunrise time, the sunset time and air temperature change predictions. In addition, the weather prediction information may also include the future wind velocity and wind direction.

Subsequently, in step S14, the power generation operating history information acquisition unit 111 acquires, from the power generator 12, the operating history information which indicates the operating history of the power generator 12.

The operating history information includes the electric power generation for each predetermined time block, and the breakdown of the usage thereof; namely, the electric energy used for the electronic device 17, the electric energy sold to the commercial power source 18, and the electric energy stored in the electric storage device 11.

The power generation operating history information acquisition unit 111 acquires, for example, the operating history information of the power generator 12 of the past week. Note that the power generation operating history information acquisition unit 111 may also acquire the operating history information of the power generator 12 of the past arbitrary hours from an arbitrary time such as one week worth of information of the same time of the previous year.

Subsequently, in step S15, the power storage operating history information acquisition unit 113 acquires, from the electric storage device 11, the operating history information which indicates the operating history of the electric storage device 11. The power storage operating history information acquisition unit 113 acquires, for example, the difference in comparison to the operating history information of the electric storage device 11 of the past 24 hours or the operating history information acquired from the electric storage device 11.

The operating history information includes the date and time of charging, the charged electric energy, and the average price of the charged electric power with regard to charging, and includes the date of time of charging, the charged electric energy and the remaining amount of charge of the electric storage device 11 with regard to discharging.

Note that the power storage operating history information acquisition unit 113 may also acquire the operating history information of the electric storage device 11 the past arbitrary hours from an arbitrary time.

The order of processing for acquiring the respective pieces of information from step S11 to step S15 is not particularly limited to the foregoing order, and the respective pieces of information may be acquired in any order.

Subsequently, in step S16, the indoor electric power demand prediction unit 106 predicts the electric power demand of the respective electronic device 17 in the user's home by using the power consumption information acquired by the power consumption information acquisition unit 115. The indoor electric power demand prediction unit 106 sets, as the indoor electric power demand of 24 hours in the future, the average of the power consumption information of the same time block in the past or the power consumption information of the past 24 hours. Note that the indoor electric power demand prediction unit 106 may also predict the indoor electric power demand based on a neutral network model in which the past power consumption information is used as an input parameter and the indoor electric power demand of the current day is used as an output parameter.

Moreover, the indoor electric power demand prediction unit 106 reflects, in the indoor electric power demand prediction, the operating time of the electronic device 17 for which a reservation setting was made by the user. In other words, the user uses the user terminal 16 or the electronic device 17 and performs the reservation setting of the operating time of a specific electronic device 17. When the reservation setting of the operating time of a specific electronic device 17 is performed, the user terminal 16 or the electronic device 17 sends, to the communication unit 130, the operating time for which the reservation setting was performed as the operating schedule information, and the communication unit 130 sends the received operating schedule information to the indoor electric power demand prediction unit 106 via the device control unit 108. The indoor electric power demand prediction unit 106 predicts the indoor electric power demand, upon giving consideration to the operating time and the power consumption of the electronic device for which the reservation setting was performed, based on the received operating schedule information.

Subsequently, in step S17, the power generation prediction unit 102 predicts the electric power generation, for each predetermined time block, of the power generator 12 by using the operating history information of the power generator 12 acquired by the power generation operating history information acquisition unit 111, and the weather prediction information acquired by the weather prediction information acquisition unit 112. The electric power generation of a power generator which converts natural energy into electric power will change considerably depending on the weather conditions. For example, the electric power generation of a solar power generator will change depending on whether or not the weather is sunny. Thus, the power generation prediction unit 102 can predict the electric power generation by using the weather prediction information acquired by the weather prediction information acquisition unit 112. Moreover, the operating history information of the power generator 12 is information which associates actual past weather and the actual value of electric power generation. Thus, the power generation prediction unit 102 calculates the time change of the electric power generation of the following day based on the weather of each predetermined time (for instance, every hour) from the sunrise time to the sunset time of the following day, and the electric power generation that is associated with that weather.

Note that, in embodiment 1, while the power generation prediction unit 102 predicts the electric power generation, for each predetermined time block, the power generator 12 by using the operating history information of the power generator 12 and the weather prediction information, the present invention is not limited thereto. The power generation prediction unit 102 may also predict the electric power generation, for each predetermined time block, of the power generator 12 by using only the operating history information of the power generator 12, or predict the electric power generation, for each predetermined time block, of the power generator 12 by using only the weather prediction information. When using only the operating history information of the power generator 12, the power generation prediction unit 102 uses, as-is, the time change of the electric power generation of the previous day (for example, from the current time to 24 hours before) as the electric power generation of the following day (for example, from the current time to 24 hours later). Moreover, when using only the weather prediction information, the power generation prediction unit 102 calculates the time change of the electric power generation from the weather of the following day (for example, from the current time to 24 hours later).

Subsequently, in step S18, the power generation price prediction unit 103 generates the generated power operating plan by using the electric power generation for each predetermined time block predicted by the power generation prediction unit 102, and the electric power selling price information contained in the electric power price information acquired by the electric power price information acquisition unit 114, and additionally predicts, for each predetermined time block, the electric power price of the electric power usage of electric power that was generated by the power generator 12. For example, the power generation price prediction unit 103 of this embodiment sets the electric power price, upon using the electric power generated by the power generator 12, to 0 yen/kWh since natural energy which is free from fuel costs is used.

Note that the power generation price prediction unit 103 may also more closely predict, for each predetermined time block, the electric power price of the electric power usage of electric power that was generated by the power generator 12 by giving consideration to the installation cost of the power generator 12 and the electric power selling price of the generated electric power. In the foregoing case, for example, the cumulative amount (I) of earnings from electric power selling is subtracted from the total costs (C) that were required upon installing the power generator 12, and the product is divided by the expected value (E) of the total electric power generation until the power generator 12 reaches its lift, and the resulting value (C−I)/E yen/kWh is set as the electric power price.

The power generation price prediction unit 103 calculates the cumulative amount (I) of earnings from the electric power selling based on the electric power selling price information contained in the electric power price information acquired by the electric power price information acquisition unit 114 and the electric energy sold to the commercial power source 18 contained in the operating history information of the power generator 12 which was acquired through the power generation prediction unit 102, and predicts, for each predetermined time block, the electric power price when the electric power generated by the power generator 12 is used.

Subsequently, in step S19, the charging/discharging plan generation unit 104 generates an operation plan of the electric storage device 11 by using the operating history information of the electric storage device 11 acquired by the power storage operating history information acquisition unit 113, the electric power purchase price information contained in the electric power price information acquired by the electric power price information acquisition unit 114, the indoor electric power demand predicted by the indoor electric power demand prediction unit 106, and the allocation of storage of the generated electric power in the electric storage device 11, for each predetermined time block, in the generated power operating plan generated by the power generation price prediction unit 103.

The charging/discharging plan generation unit 104 generates a charging/discharging plan for performing charging in a time block in which the electric power purchase price is least expensive and in a time block when power is generated by the power generator 12, and performing discharging in a time block when the electric power purchase price is most expensive. The charging/discharging plan generation unit 104 determines the time block and amount of charge for performing charging using the electric power generated by the power generator 12 based on the allocation to the storage of the generated electric power in the electric storage device 11 for each predetermined time block in the generated power operating plan which was generated by the power generation price prediction unit 103. Moreover, the charging/discharging plan generation unit 104 determines the time block and the amount of charge for performing charging using the electric power supplied from the commercial power source 18 based on the electric power purchase price information contained in the electric power price information which was acquired by the electric power price information acquisition unit 114. Note that the charging/discharging plan generation unit 104 makes the determination so that charging is performed in a time block in which the electric power purchase price is the least expensive.

Moreover, the charging/discharging plan generation unit 104 determines the time block and the amount of charge for performing discharging based on the electric power purchase price information contained in the electric power price information which was acquired by the electric power price information acquisition unit 114 and the indoor electric power demand which was predicted by the indoor electric power demand prediction unit 106. Note that the charging/discharging plan generation unit 104 makes the determination of performing discharging in a time block in which the electric power purchase price is the most expensive and in a time block in which the electric power used indoors is the greatest. Moreover, the charging/discharging plan generation unit 104 may also make the determination of performing discharging in a time block in which the electric power purchase price is a predetermined price or more, and in a time block in which the electric power used indoors is a predetermined electric power or more.

Subsequently, in step S20, the power storage price prediction unit 105 predicts, for each predetermined time block, the electric power price when the electric power stored in the electric storage device 11 is used by computing the substantial unit price of the electric power stored in the electric storage device 11 based on the electric power purchase price information contained in the electric power price information which was acquired by the electric power price information acquisition unit 114, the electric power price of the electric power generated by the power generator 12 which was predicted by the power generation price prediction unit 103, and the electric energy charged or discharged based on the charging/discharging plan of the electric storage device 11 which was generated by the charging/discharging plan generation unit 104.

The method of calculating the electric power price upon using the electric power stored in the electric storage device 11 is now explained in detail. Note that, in the ensuing explanation, the electric power price upon using the electric power stored in the electric storage device 11 shall be the electric power price or the stored power price of the electric storage device 11.

Figure 4:
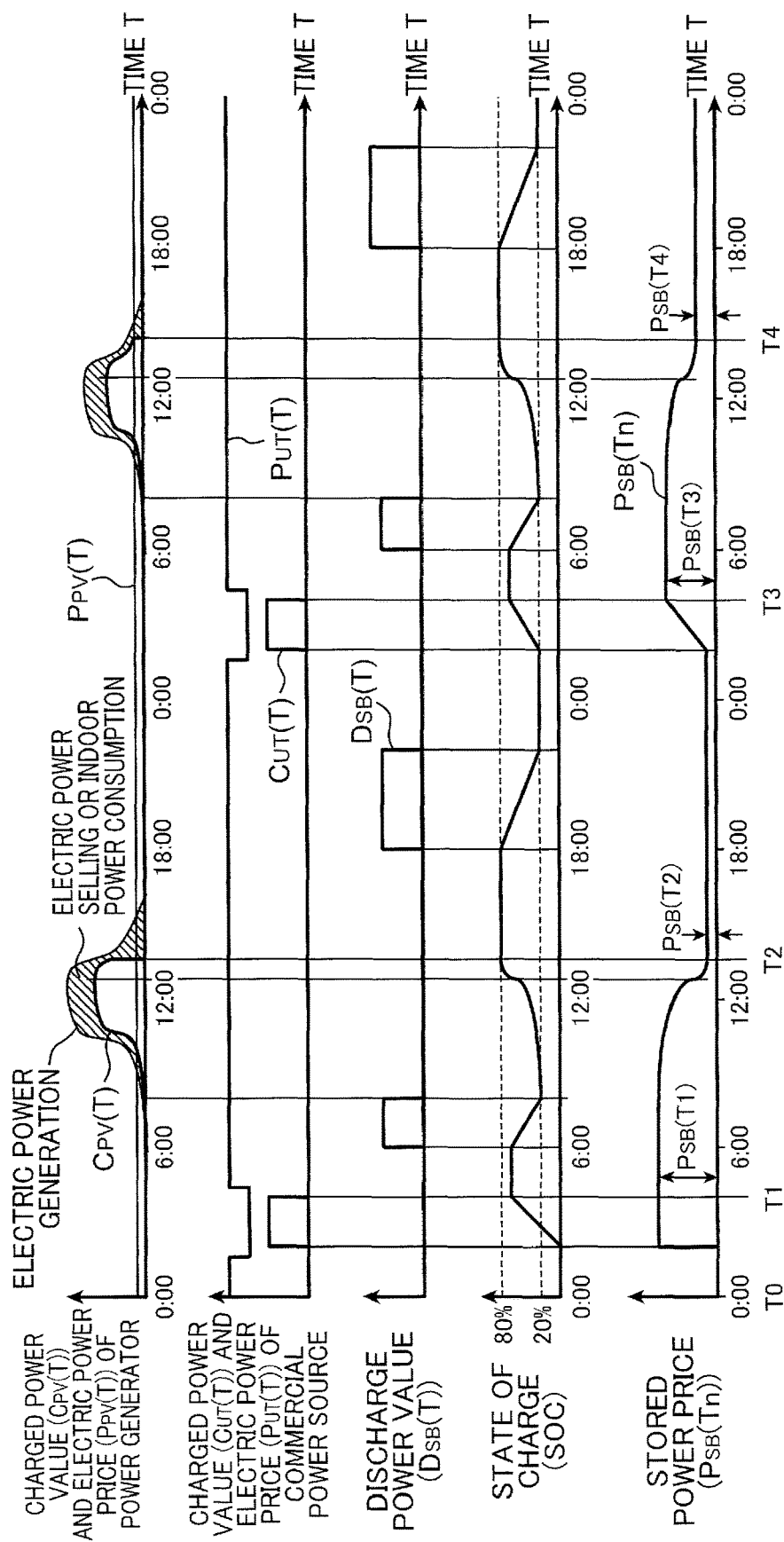
FIG. 4 is a diagram explaining the method of calculating the electric power price of the electric storage device in embodiment 1 of the present invention.

FIG. 4 is a diagram explaining the method of calculating the electric power price of the electric storage device 11 in embodiment 1 of the present invention. In FIG. 4, in order from top to bottom, indicated are a charged power value $C_{PV}(T)$ and an electric power price $P_{PV}(T)$ of the power generator 12, a charged power value $C_{UT}(T)$ and an electric power price $P_{UT}(T)$ of the commercial power source 18, and a discharge power value $D_{SB}(T)$, a State Of Charge (SOC), and a stored power price $P_{SB}(Tn)$.

The charged power value $C_{PV}(T)$ is a value obtained by subtracting the sold electric energy and the electric energy consumed indoors from the electric power generation of the power generator 12.

The power storage price prediction unit 105 calculates the stored power price $P_{SB}(Tn)$ based on Formula (1) below.

[Math. 1]

$$P_{SB}(Tn) = \frac{\int_{T0}^{Tn} P_{UT}(t)C_{UT}(t)\,dt + \int_{T0}^{Tn} P_{PV}(t)C_{PV}(t)\,dt - \sum_{a=1}^{n}\left(P_{SB}(T_{a-1})\int_{T_{a-1}}^{T_a} D_{SB}(s)\,ds\right)}{\int_{T0}^{Tn} C_{UT}(t)\,dt + \int_{T0}^{Tn} C_{PV}(t)\,dt - \int_{T0}^{Tn} D_{SB}(t)\,dt} \quad (1)$$

The stored power price $P_{SB}(Tn)$ indicates the stored power price at timing T1, T2, T3, T4, when the series of charging operations of the electric storage device 11 are ended. The stored power price changes during the charging operation, and does not change during the discharging operation.

In particular, T1 indicates the timing that the first charging operation has ended in the electric storage device 11 in a state with no charge (SOC=0%). In the foregoing case, since there is no need to give consideration to the discharged portion, the stored power price $P_{SB}(T1)$ is calculated based on Formula (2) below.

[Math. 2]

$$P_{SB}(T1) = \frac{\int_{T0}^{T1} P_{UT}(t)C_{UT}(t)\,dt + \int_{T0}^{T1} P_{PV}(t)C_{PV}(t)\,dt}{\int_{T0}^{T1} C_{UT}(t)\,dt + \int_{T0}^{T1} C_{PV}(t)\,dt} \quad (2)$$

Subsequently, in step S21, the user price list generation unit 107 generates a user price list which indicates, for each predetermined electric power usage and for each predetermined time block, the electric power purchase price information contained in the electric power price information acquired by the electric power price information acquisition unit 114, the electric power price of the electric power generated by the power generator 12 which was predicted by the power generation price prediction unit 103, and the electric power price upon using the electric power stored in the electric storage device 11 which was predicted by the power storage price prediction unit 105.

Subsequently, in step S22, the communication unit 130 sends, to the user terminal 16, the user price list that was generated by the user price list generation unit 107.

The processing of generating a user price list in embodiment 1 is now explained in further detail with reference to FIG. 5 to FIG. 8.

Figure 5:
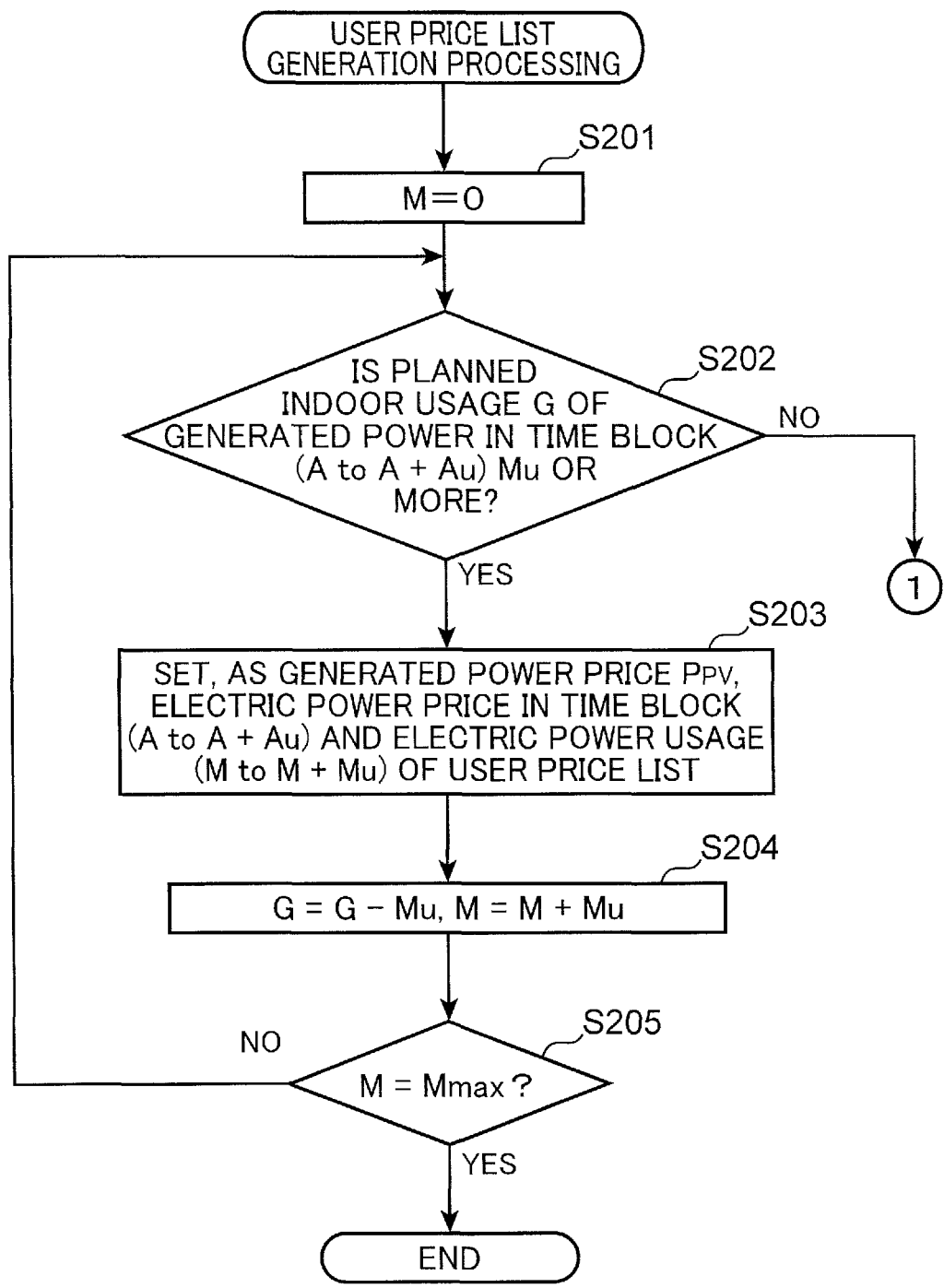
FIG. 5 is a first flowchart explaining the processing of generating a user price list in embodiment 1 of the present invention.
Figure 6:
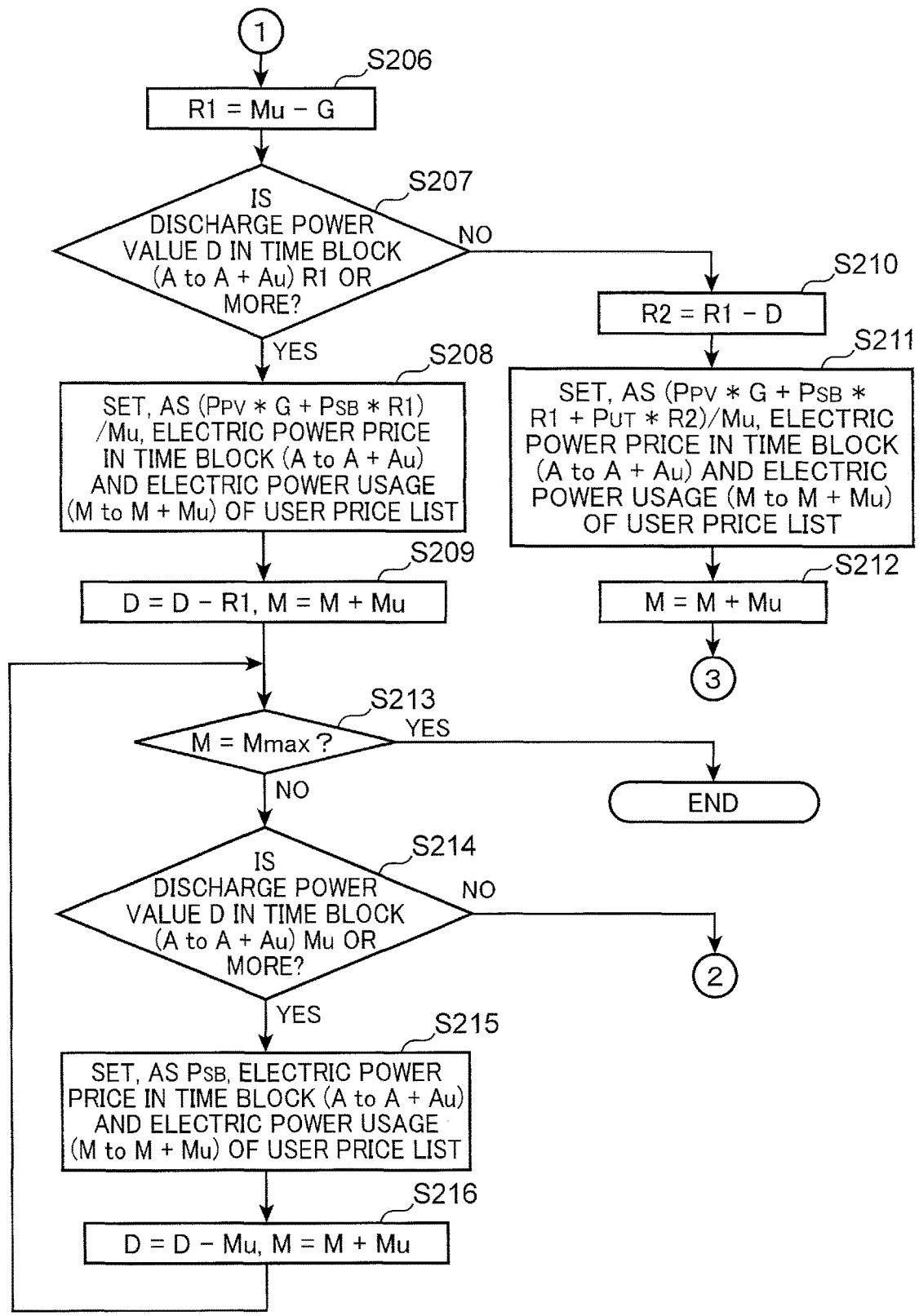
FIG. 6 is a second flowchart explaining the processing of generating a user price list in embodiment 1 of the present invention.
Figure 7:
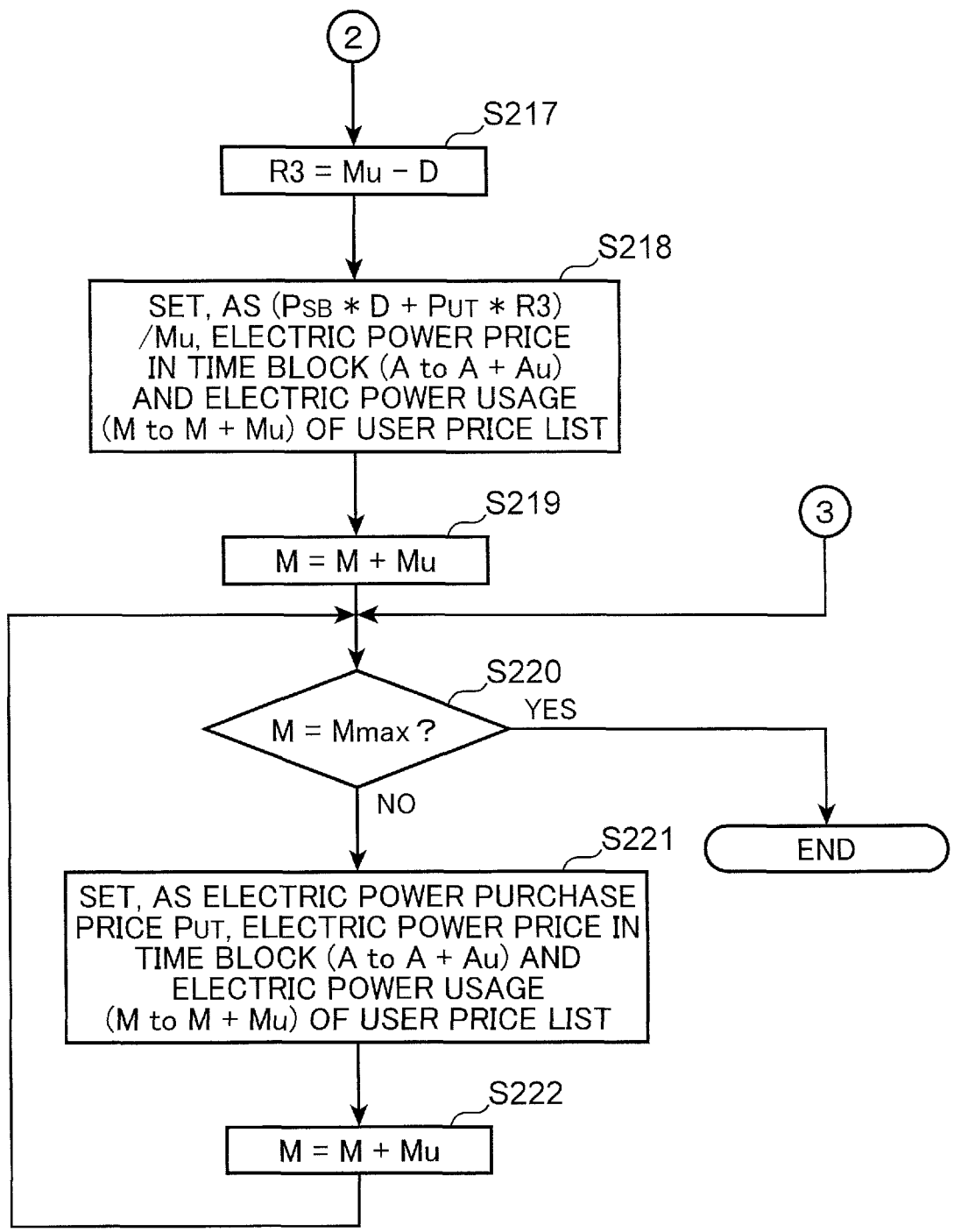
FIG. 7 is a third flowchart explaining the processing of generating a user price list in embodiment 1 of the present invention.

FIG. 5 is a first flowchart explaining the processing of generating a user price list in embodiment 1 of the present invention, FIG. 6 is a second flowchart explaining the processing of generating a user price list in embodiment 1 of the present invention, FIG. 7 is a third flowchart explaining the processing of generating a user price list in embodiment 1 of the present invention, and FIG. 8 is a diagram explaining the processing of generating a user price list in embodiment 1 of the present invention.

Note that, in the ensuing explanation, explained is the processing for generating a user price list which indicates the electric power price, with the electric power usage M(0 to Mmax) as the predetermined electric energy interval Mu, in a time block between time A and time (A+Au).

Foremost, in step S201, the user price list generation unit 107 sets the electric power usage M to 0.

Subsequently, in step S202, the user price list generation unit 107 determines whether the planned indoor usage G of the generated power in the time block (A to A+Au) based on the generated power operating plan is not less than the predetermined electric energy interval Mu. Here, when it is determined that the planned indoor usage G is not less than the predetermined electric energy interval Mu (step S202: YES), in step S203, the user price list generation unit 107 sets the electric power price in the time block (A to A+Au) and the electric power usage (M to M+Mu) of the user price list to the generated power price $P_{PV}$. The generated power price $P_{PV}$ is the electric power price of the power generator 12.

Subsequently, in step S204, the user price list generation unit 107 subtracts the electric energy interval Mu from the planned indoor usage G of the generated power, and ads the electric energy interval Mu to the electric power usage M.

Subsequently, in step S205, the user price list generation unit 107 determines whether the electric power usage M is the maximum value Mmax. Here, when it is determined that the electric power usage M is the maximum value Mmax (step S205: YES), the user price list generation processing in the time block (A to A+Au) is ended.

Meanwhile, when it is determined that the electric power usage M is not the maximum value Mmax (step S205: NO), the processing returns to step S202.

Moreover, in step S202, when it is determined that the planned indoor usage G is smaller than the predetermined electric energy interval Mu (step S202: NO), in step S206, the user price list generation unit 107 subtracts the planned indoor usage G from the electric energy interval Mu and sets the resulting value as a first value R1.

Subsequently, in step S207, the user price list generation unit 107 determines whether the discharge power value D of the electric storage device 11 in the time block (A to A+Au) based on the charging/discharging plan is not less than the first value R1. Here, when it is determined that the discharge power value D of the electric storage device 11 is not less than the first value R1 (step S207: YES), in step S208, the user price list generation unit 107 sets the electric power price in the time block (A to A+Au) and the electric power usage (M to M+Mu) of the user price list to $(P_{PV} \times G + P_{SB} \times R1)/Mu$. Note that $P_{SB}$ indicates the stored power price in the time block (A to A+Au) predicted by the power storage price prediction unit 105.

Subsequently, in step S209, the user price list generation unit 107 subtracts the first value R1 from the discharge power value D of the electric storage device 11, adds the electric energy interval Mu to the electric power usage M, and the processing proceeds to step S213 described later.

Meanwhile, when it is determined that the discharge power value D of the electric storage device 11 is smaller than the first value R1 (step S207: NO), in step S210, the user price list generation unit 107 subtracts the discharge power value D from the first value R1 and sets the resulting value as a second value R2.

Subsequently, in step S211, the user price list generation unit 107 sets the electric power price in the time block (A to A+Au) and the electric power usage (M to M+Mu) of the user price list to $(P_{PV} \times G + P_{SB} \times R1 + P_{UT} \times R2)/Mu$. Note that $P_{UT}$ indicates the electric power purchase price of the electric power supplied from the commercial power source 18 in the time block (A to A+Au).

Subsequently, in step S212, the user price list generation unit 107 adds the electric energy interval Mu to the electric power usage M, and the processing proceeds to step S220 described later.

In step S213, the user price list generation unit 107 determines whether the electric power usage M is the maximum value Mmax. Here, when it is determined that the electric power usage M is the maximum value Mmax (step S213: YES), the user price list generation processing in the time block (A to A+Au) is ended.

Meanwhile, when it is determined that the electric power usage M is not the maximum value Mmax (step S213: NO), in step S214, the user price list generation unit 107 determines whether the discharge power value D of the electric storage device 11 in the time block (A to A+Au) is not less than the electric energy interval Mu. Here, when it is determined that the discharge power value D of the electric storage device 11 is not less than the electric energy interval Mu (step S214: YES), in step S215, the user price list generation unit 107 sets the electric power price in the time block (A to A+Au) and the electric power usage (M to M+Mu) of the user price list to the stored power price $P_{SB}$.

Subsequently, in step S216, the user price list generation unit 107 subtracts the electric energy interval Mu from the discharge power value D of the electric storage device 11, adds the electric energy interval Mu to the electric power usage M, and the processing returns to step S213.

Meanwhile, when it is determined that the discharge power value D of the electric storage device 11 is less than the electric energy interval Mu (step S214: NO), in step S217, the user price list generation unit 107 sets the value obtained by subtracting the discharge power value D from the electric energy interval Mu as a third value R3.

Subsequently, in step S218, the user price list generation unit 107 sets the electric power price in the time block (A to A+Au) and the electric power usage (M to M+Mu) of the user price list to $(P_{SB} \times D + P_{UT} \times R3)/Mu$.

Subsequently, in step S219, the user price list generation unit 107 adds the electric energy interval Mu to the electric power usage M.

Subsequently, in step S220, the user price list generation unit 107 determines whether the electric power usage M is the maximum value Mmax. Here, when it is determined that the electric power usage M is the maximum value Mmax (step S220: YES), the user price list generation processing in the time block (A to A+Au) is ended.

Meanwhile, when it is determined that the electric power usage M is not the maximum value Mmax (step S220: NO), in step S221, the user price list generation unit 107 sets the electric power price in the time block (A to A+Au) and the electric power usage (M to M+Mu) of the user price list to the electric power purchase price $P_{UT}$.

Subsequently, in step S222, the user price list generation unit 107 adds the electric energy interval Mu to the electric power usage M, and the processing returns to step S220.

Based on the foregoing processing, the user price list in the time block (A to A+Au) is generated. Note that the user price list generation unit 107 sets the electric power prices in time blocks other than the current time block (A to A+Au) in the same manner as described above.

In the example of the user price list shown in FIG. 8, the electric energy interval Mu is 0.1 kWh, the maximum value Mmax is 2.0 kWh, the time interval Au is 30 minutes, and the electric power price is set every 30 minutes and every 0.1 kWh.

Figure 9:
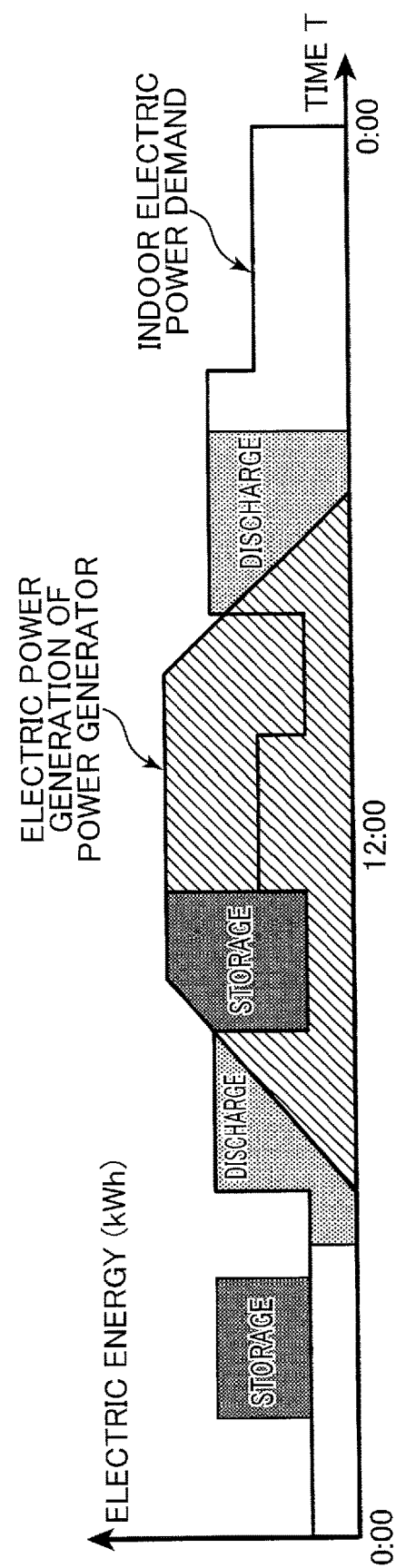
FIG. 9 is a diagram showing an example of the time change of the electric power generation of the power generator and the charging/discharging plan and the indoor electric power demand of the electric storage device in embodiment 1 of the present invention.
Figure 10:
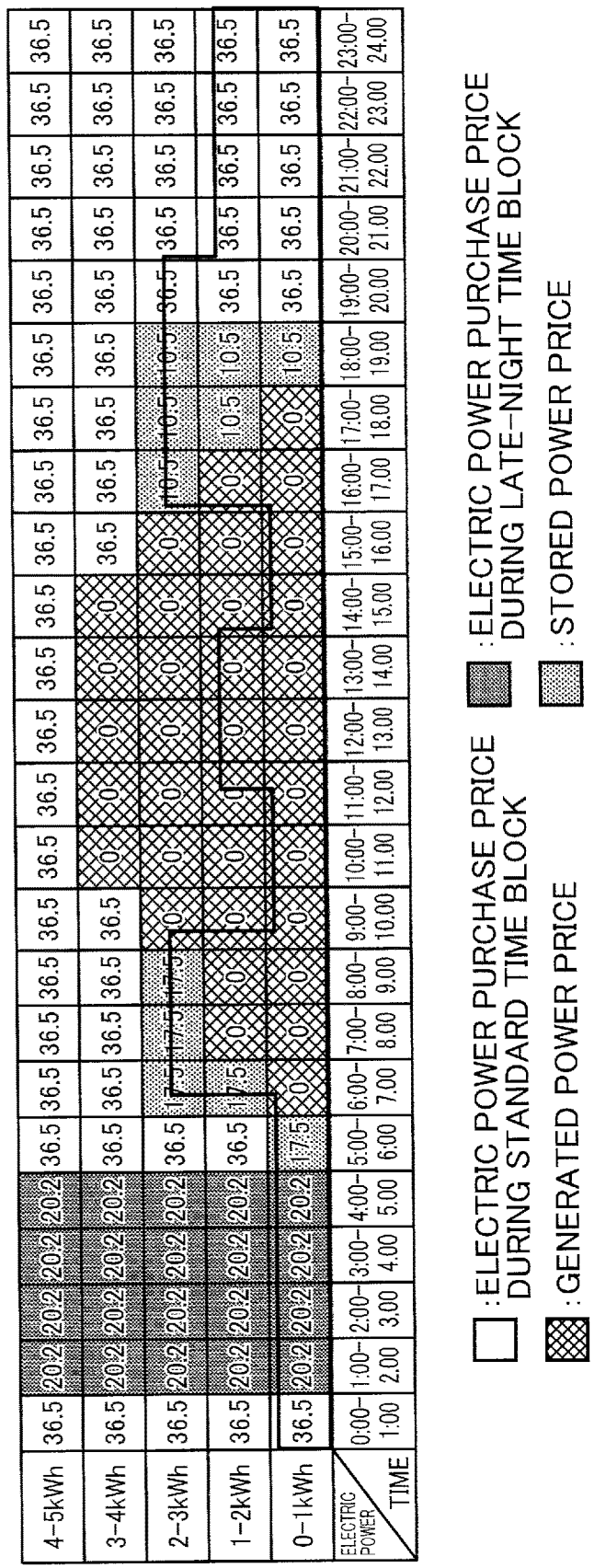
FIG. 10 is a diagram showing an example of the user price list in embodiment 1 of the present invention.

FIG. 9 is a diagram showing an example of the time change of the electric power generation of the power generator and the charging/discharging plan and the indoor electric power demand of the electric storage device in embodiment 1 of the present invention. FIG. 10 is a diagram showing an example of the user price list in embodiment 1 of the present invention. Note that the user price list shown in FIG. 10 was generated from the prediction result shown in FIG. 9.

In the example shown in FIG. 9, power is generated by the power generator 12 between 6:00 and 18:00, power is stored (charged) by the electric storage device 11 in the late-night time block (from 1:00 to 5:00) in which the electric power purchase price is the least expensive and in the time block (from 9:00 to 12:00) when power is being generated by the power generator 12, and discharge is performed by the electric storage device 11 in the morning time block (from 6:00 to 9:00) and the evening time block (from 16:00 to 19:00) when the indoor electric power demand increases.

Moreover, with the user price list shown in FIG. 10, the electric power price of the least expensive electric power that is available is displayed for every hour and every electric power usage of 1 kWh. In other words, the user price list generation unit 107 generates a user price list which indicates, for each predetermined electric power usage and for each predetermined time block, the least expensive electric power price among the electric power purchase price acquired by the electric power price information acquisition unit 114, the electric power price of the electric power generated by the power generator 12 which was predicted by the power generation price prediction unit 103, and the electric power price upon using the electric power stored in the electric storage device 11 which was predicted by the power storage price prediction unit 105.

Moreover, the electric power purchase price of a standard time block, the electric power purchase price of a late-night time block, the generated power price of the power generator 12, and the stored power price of the electric storage device 11 are respectively displayed in a distinguishable manner; for instance, by being color coded. In other words, the user price list generation unit 107 generates a user price list in which the electric power purchase price acquired by the electric power price information acquisition unit 114, the electric power price of the electric power generated by the power generator 12 which was predicted by the power generation price prediction unit 103, and the electric power price upon using the electric power stored in the electric storage device 11 which was predicted by the power storage price prediction unit 105 are respectively indicated with different colors.

In FIG. 10, the electric power purchase price of the standard time block is 36.5 yen/kWh, the electric power purchase price of the late-night time block is 20.2 yen/kWh, the generated power price is 0 yen/kWh, and the stored power price is 17.5 yen/kWh or 10.5 yen/kWh. Note that, while prices are indicated in the user price list in FIG. 10, the present invention is not particularly limited thereto, and the user price list may also be color-coded without indicating the prices.

In addition, the indoor electric power demand is superimposed on the user price list and displayed. In other words, the user price list generation unit 107 superimposes, on the user price list, the prediction result of the electric power demand of the electronic device 17 in the user's home which was predicted by the indoor electric power demand prediction unit 106.

Furthermore, the user price list generation unit 107 indicates the electric power purchase price on the user price list with regard to the time block in which the power generator 12 does not generate power and the time block in which the electric storage device 11 does not perform discharging, and indicates the electric power price in a case of preferentially using a less expensive electric power among the electric power supplied from the commercial power source 18, the electric power generated by the power generator 12, and the electric power stored in the electric storage device 11 on the user price list with regard to the time block in which either the power generator 12 or the electric storage device 11 is operated based on the electric power generation of the power generator 12 predicted by the power generation prediction unit 102 and the operation plan of the electric storage device 11 generated by the charging/discharging plan generation unit 104.

The operation of the user terminal according to embodiment 1 of the present invention is now explained.

Figure 11:
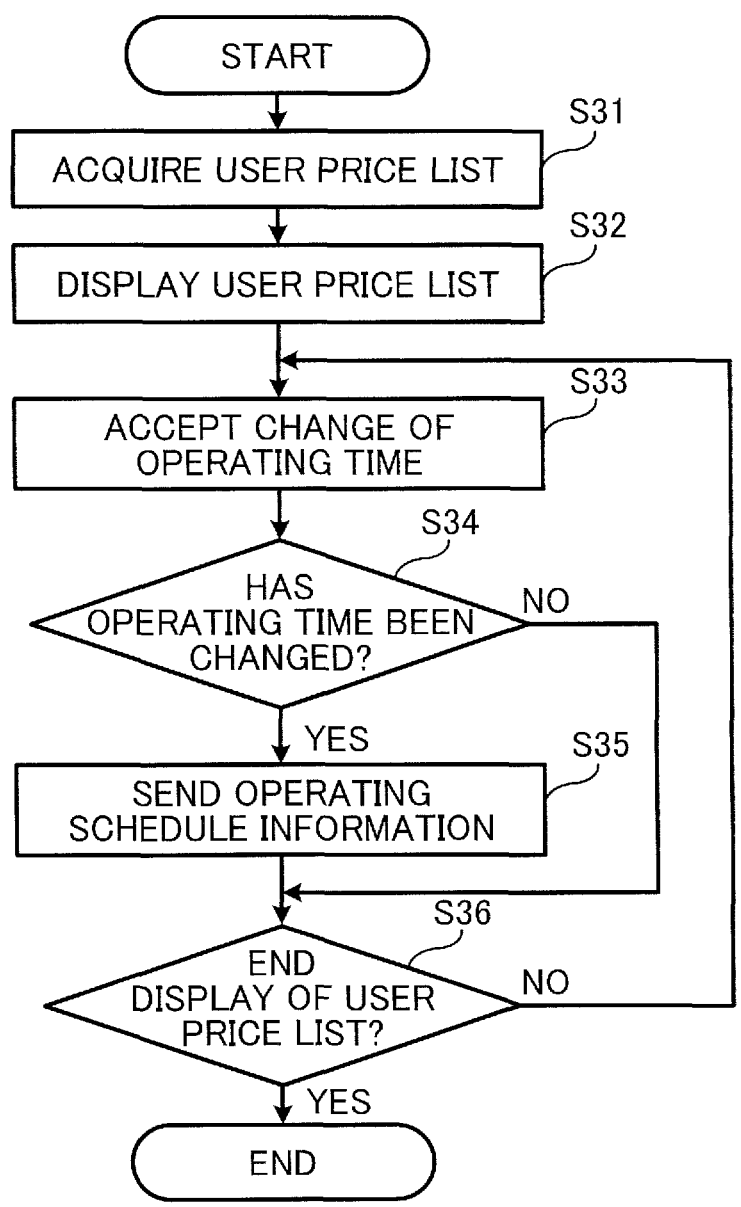
FIG. 11 is a flowchart explaining the operation of the user terminal according to embodiment 1 of the present invention.

FIG. 11 is a flowchart explaining the operation of the user terminal according to embodiment 1 of the present invention.

Foremost, in step S31, the user price list acquisition unit 161 acquires the user price list that was sent by the communication unit 130 of the energy management device 10.

Subsequently, in step S32, the user price list display unit 162 displays the user price list that was acquired by the user price list acquisition unit 161.

Subsequently, the operating time change acceptance unit 163 accepts the change in the operating time of the electronic device, in which the operating time can be changed, from the user price list displayed by the user price list display unit 162. The user price list also displays the indoor electric power demand together with the electric power price. Here, the operating time of the electronic device, in which the operating time can be changed, is displayed in a distinguishable manner.

Figure 12:
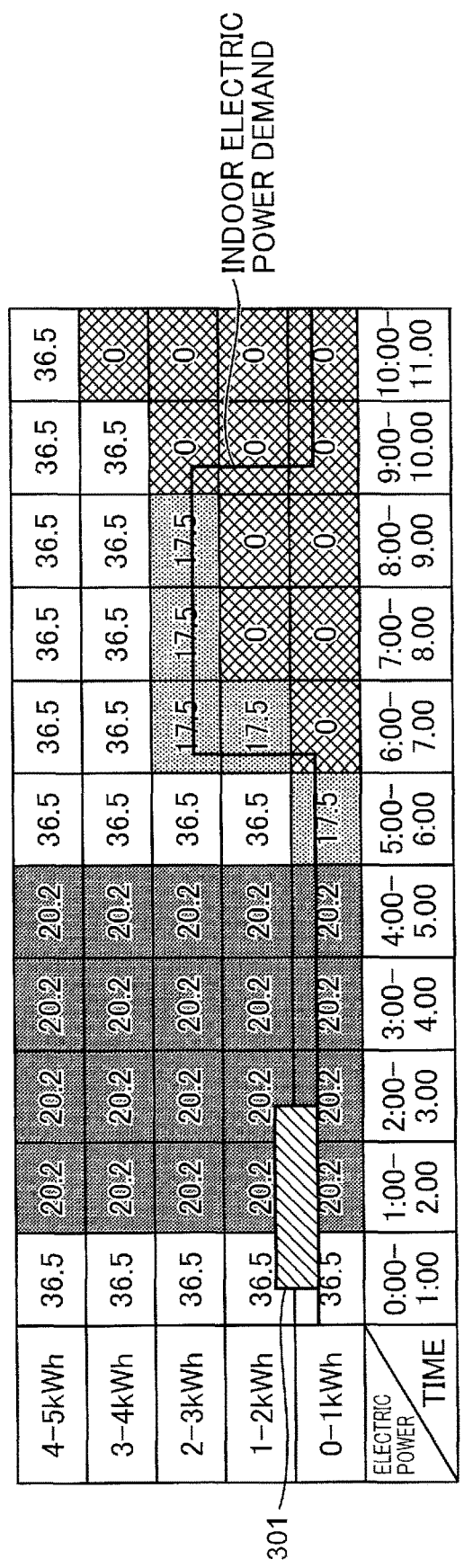
FIG. 12 is a diagram showing an example of the user price list before the operating time is changed in embodiment 1.
Figure 13:
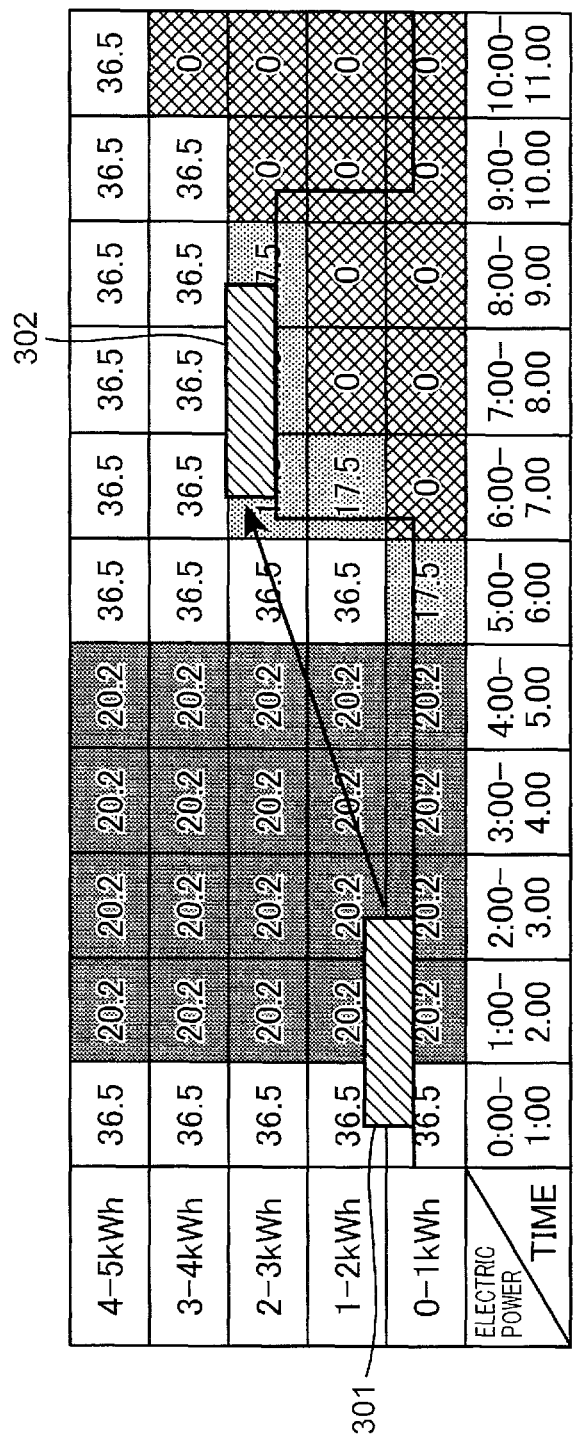
FIG. 13 is a diagram showing an example of the user price list when the operating time is changed and the user price list after the operating time has been changed in embodiment 1.

FIG. 12 is a diagram showing an example of the user price list before the operating time is changed in embodiment 1, and FIG. 13 is a diagram showing an example of the user price list when the operating time is changed and the user price list after the operating time has been changed in embodiment 1.

As shown in FIG. 12, the user price list displays the indoor electric power demand. This indoor electric power demand include an operating change region 301 which indicates the operating time and the electric power usage of the electronic device in which the operating time can be changed. The user uses, for example, an operation button, a touch panel, a keyboard or a mouse to select the operating change region 301 corresponding to an electronic device in which the operating time can be changed, and moves the selected operating change region 301 to the intended position. Here, the operating change region 301 is displayed by the user price list display unit 162 so as to move along the line indicating the indoor electric power demand.

As shown in FIG. 13, when the current operating change region 301 is the operating time from 0:20 to 2:20, the cost can be minimized by moving the operating change region 301 at 9:00 onward. Nevertheless, for example, if the user is scheduled to go out from 8:45 and the operation of the electronic device needs to be completed before 8:45, the operating change region 301 cannot be moved to the position of 9:00. Thus, the user moves the operating change region 301 to a position 302 of 6:30 to 8:30, which is before 8:45 and in which the cost can be minimized. As described above, the operating time can be changed so that both the user's convenience and profit can be achieved while engaging in trial and error through operations on the screen of the user's terminal displaying the user price list.

It is thereby possible to determine the schedule capable of achieving both the user's convenience and the user's profit.

Note that, in addition to merely displaying the operating change region 301 and the operating change region 302, it is also possible to calculate the price of the electric power used by the electronic device 17 corresponding to the operating change region, and simultaneously display the operating change region 301 and the operating change region 302 together with their corresponding calculated prices.

Returning to FIG. 11, in step S34, the operating time change acceptance unit 163 determines whether the operating time has been changed. Here, when it is determined that the operating time has not been changed (step S34: NO), the processing proceeds to step S36. Meanwhile, when it is determined that the operating time has been changed (step S34: YES), in step S35, the operating time change acceptance unit 163 sends, to the energy management device 10, the operating schedule information which indicates the operating time that was changed by the operating time change acceptance unit 163.

Subsequently, the communication unit 130 of the energy management device 10 receives the operating schedule information that was sent by the operating time change acceptance unit 163. The communication unit 130 outputs the received operating schedule information to the device control unit 108. The device control unit 108 outputs a control signal to the electronic device for changing the operating time based on the operating schedule information. Moreover, the device control unit 108 outputs the operating schedule information to the indoor electric power demand prediction unit 106. The indoor electric power demand prediction unit 106 reflects the changed operating time accepted by the operating time change acceptance unit 163 in the indoor electric power demand, and outputs, to the user price list generation unit 107, the indoor electric power demand which reflects the changed operating time. The user price list generation unit 107 superimposes, on the user price list, the indoor electric power demand which reflects the changed operating time.

Subsequently, in step S36, the user price list display unit 162 determines whether the display of the user price list should be ended. Here, when it is determined that the user price list should be ended (step S36: YES), the processing is ended. Meanwhile, when it is determined that the user price list should not be ended (step S36: NO), the processing returns to step S33.

The information processing system according to a modified example of embodiment 1 of the present invention is now explained.

Figure 14:
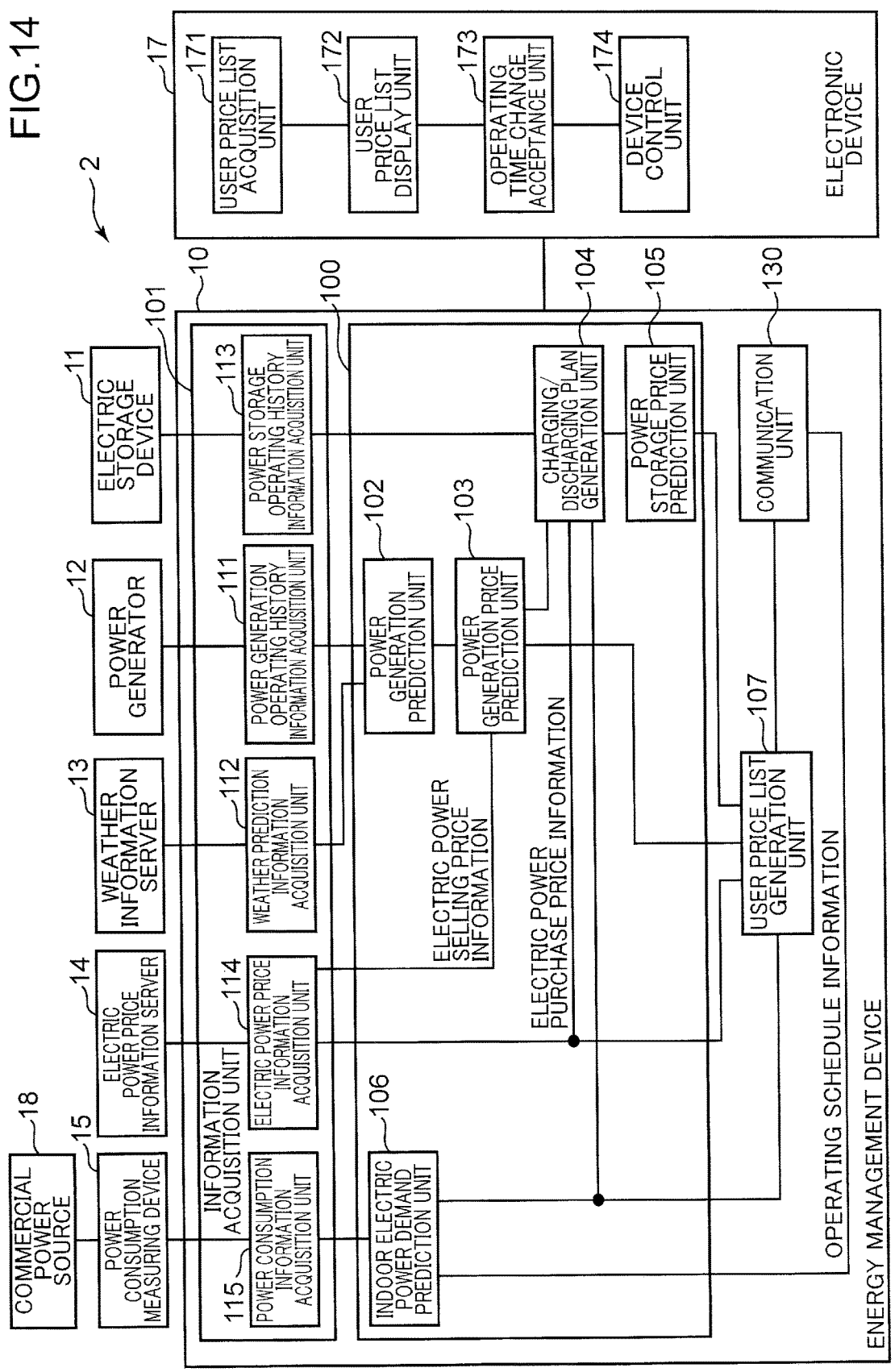
FIG. 14 is a diagram showing the configuration of the information processing system according to a modified example of embodiment 1 of the present invention.

FIG. 14 is a diagram showing the configuration of the information processing system according to a modified example of embodiment 1 of the present invention. The information processing system 2 shown in FIG. 14 comprises an energy management device 10, an electric storage device 11, a power generator 12, a weather information server 13, an electric power price information server 14, a power consumption measuring device 15 and an electronic device 17. The information processing system 2 shown in FIG. 14 and the information processing system 1 shown in FIG. 1 differ with respect to the point that the information processing system 2 does not comprise a user terminal, and the function of the user terminal of the information processing system 1 is equipped in the electronic device.

The energy management device 10 comprises an information acquisition unit 101, a power generation prediction unit 102, a power generation price prediction unit 103, a charging/discharging plan generation unit 104, a power storage price prediction unit 105, an indoor electric power demand prediction unit 106, a user price list generation unit 107 and a communication unit 130. The electronic device 17 comprises a user price list acquisition unit 171, a user price list display unit 172, an operating time change acceptance unit 173 and a device control unit 174. The price determination unit 100 is configured from a power generation prediction unit 102, a power generation price prediction unit 103, a charging/discharging plan generation unit 104, a power storage price prediction unit 105 and an indoor electric power demand prediction unit 106.

The user price list acquisition unit 171, the user price list display unit 172 and the operating time change acceptance unit 173 have the same functions as the user price list acquisition unit 161, the user price list display unit 162 and the operating time change acceptance unit 163 shown in FIG. 1. The device control unit 174 controls the electronic device 17. The device control unit 174 changes the operating time based on the operating schedule information which indicates the operating time that was changed by the operating time change acceptance unit 163. Moreover, the communication unit 130 outputs the received operating schedule information to the indoor electric power demand prediction unit 106. The indoor electric power demand prediction unit 106 reflects, in the indoor electric power demand, the changed operating time that was accepted by the operating time change acceptance unit 163, and outputs, to the user price list generation unit 107, the indoor electric power demand which reflects the changed operating time.

Note that, since the remaining configuration of the information processing system 2 is the same as the configuration of the information processing system 1 shown in FIG. 1, the detailed explanation thereof is omitted.

As described above, with the modified example of embodiment 1, the user price list can be displayed on the electronic device.

Note that the power generator 12 in embodiment 1 is not limited to a solar power generator, and is preferably one among a solar power generator, a wind power generator which converts wind energy into electric power, a water power generator which converts water power energy into electric power, a geothermal power generator which converts geothermal energy into electric power, or a fuel cell power generator which converts chemical energy into electric power by causing the hydrogen obtained from fuel such as town gas to react with oxygen in the air.

In addition, with embodiment 1, while the user price list is displayed on the user terminal 16 or the electronic device 17, the present invention is not limited thereto, and the energy management device 10 may also comprise a user price list display unit.

Embodiment 2

The information processing system according to embodiment 2 is now explained. The information processing system according to embodiment 2 calculates the optimal operation timing of the electronic device, and superimposes, with the user price list, the electric power usage and the operating time according to the calculated operation timing.

Figure 15:
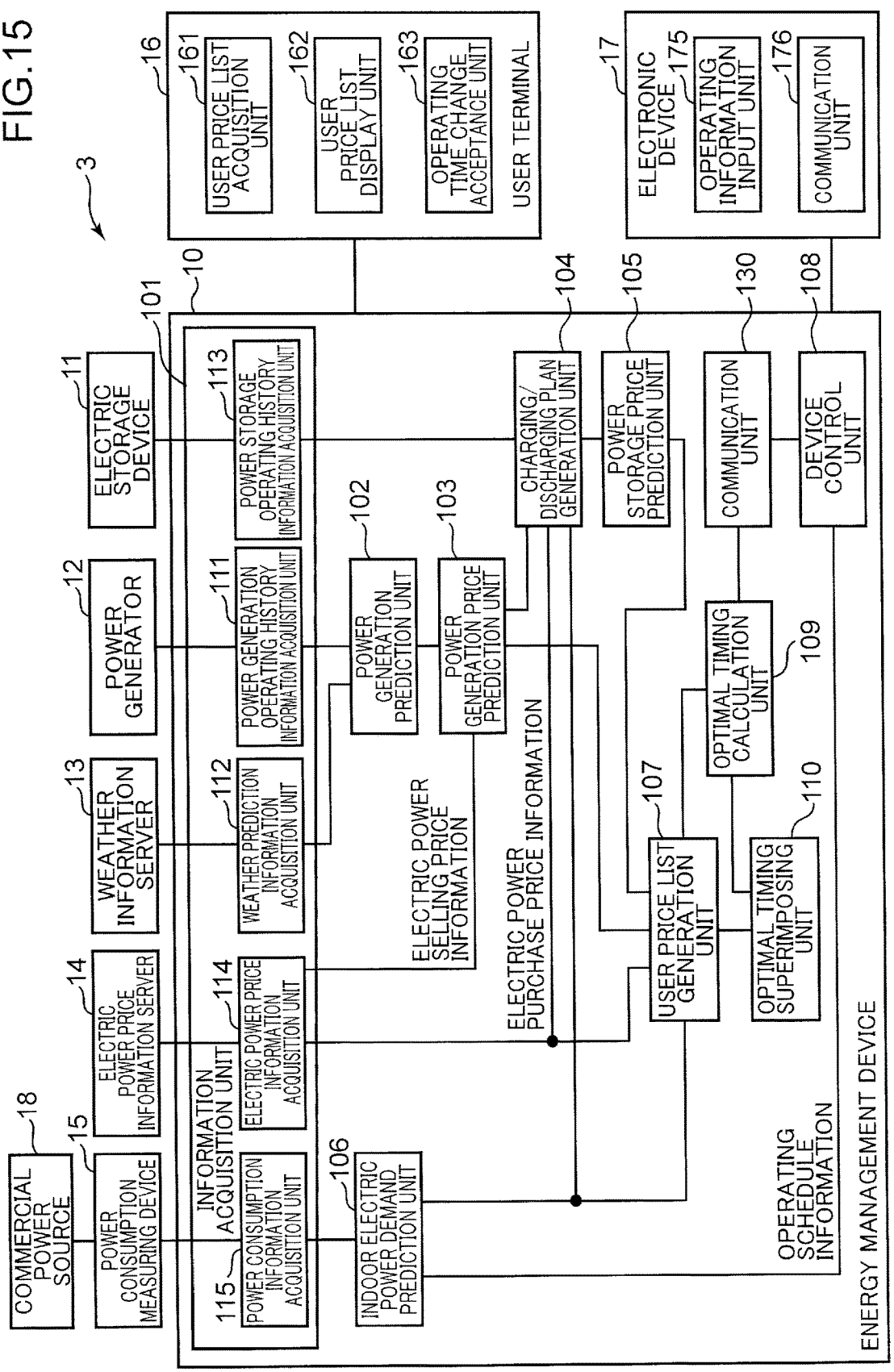
FIG. 15 is a diagram showing the configuration of the information processing system according to embodiment 2 of the present invention.

FIG. 15 is a diagram showing the configuration of the information processing system according to embodiment 2 of the present invention. The information processing system 3 shown in FIG. 15 comprises an energy management device 10, an electric storage device 11, a power generator 12, a weather information server 13, an electric power price information server 14, a power consumption measuring device 15, a user terminal 16 and an electronic device 17.

The energy management device 10 comprises an information acquisition unit 101, a power generation prediction unit 102, a power generation price prediction unit 103, a charging/discharging plan generation unit 104, a power storage price prediction unit 105, an indoor electric power demand prediction unit 106, a user price list generation unit 107, a device control unit 108, an optimal timing calculation unit 109, an optimal timing superimposing unit 110 and a communication unit 130. The electronic device 17 comprises an operating information input unit 175 and a communication unit 176. Note that, in embodiment 2, the same configuration as the information processing system 1 according to embodiment 1 is given the same reference numeral, and the explanation thereof is omitted.

The price determination unit 100 is configured from a power generation prediction unit 102, a power generation price prediction unit 103, a charging/discharging plan generation unit 104, a power storage price prediction unit 105 and an indoor electric power demand prediction unit 106. Note that the price determination unit 100 is omitted in FIG. 15.

The operating information input unit 175 is, for example, an input terminal comprising an operation screen or the like, and accepts the input of operating information from the user such as the selection of a specific operation menu or timer setting. When the operating information input unit 175 accepts an input of operating information, the operating period information which indicates the period that the electronic device 17 needs to be operated and the electric power information which indicates the electric power required for operating the electronic device 17 are determined. Note that, in this embodiment, while the operating information input unit 175 accepts the input of operating period information of the electronic device 17 from the user, the present invention is not limited thereto, and the operating information input unit 175 may also accept the input of the desired operating start time or the desired operating end time of the electronic device 17, or accept the inputs of both the desired operating start time and the desired operating end time of the electronic device 17. In the foregoing case, the operating information input unit 175 calculates the operating period information based on the desired operating start time and/or the desired operating end time. The operating information input unit 175 outputs the operating period information and the electric power information to the communication unit 176.

The communication unit 176 sends, to the energy management device 10, the operating period information which indicates the period that the electronic device 17 needs to be operated and the electric power information which indicates the electric power required for operating the electronic device 17. Note that the configuration may also be such that the communication unit 176 of the electronic device 17 sends, to the energy management device 10, the operating information accepted by the operating information input unit 175, and the energy management device 10 converts the operating period information and the electric power information of the electronic device 17.

The communication unit 130 of the energy management device 10 receives the operating period information which indicates the period that the electronic device 17 needs to be operated and the electric power information which indicates the electric power required for operating the electronic device 17. The communication unit 130 outputs the received operating period information and electric power information to the optimal timing calculation unit 109.

The user price list generation unit 107 outputs the generated user price list to the optimal timing calculation unit 109.

The optimal timing calculation unit 109 calculates, as the optimal timing, the operating start time in which the price of the electric power that is used when the electronic device 17 will not be greater than a predetermined price based on the operating period information and the electric power information received by the communication unit 130 and the user price list generated by the user price list generation unit 107. Note that the optimal timing calculation unit 109 calculates, as the optimal timing, the operating start time in which the price of the electric power that is used when the electronic device 17 will be the least expensive price. Moreover, the optimal timing calculation unit 109 may also calculate only the operating end time rather than calculating only the operating start time, or calculate both the operating start time and the operating end time.

The optimal timing superimposing unit 110 acquires the user price list from the user price list generation unit 107. The optimal timing superimposing unit 110 superimposed, on the user price list, the operation period and the electric energy required for operating the electronic device 17 based on the operating start time calculated by the optimal timing calculation unit 109. The optimal timing superimposing unit 110 outputs, to the user price list generation unit 107, the user price list which was superimposed with the operation period and the electric energy required for operating the electronic device 17.

Note that the operation of the information processing system 3 according to embodiment 2 is now explained.

Figure 16:
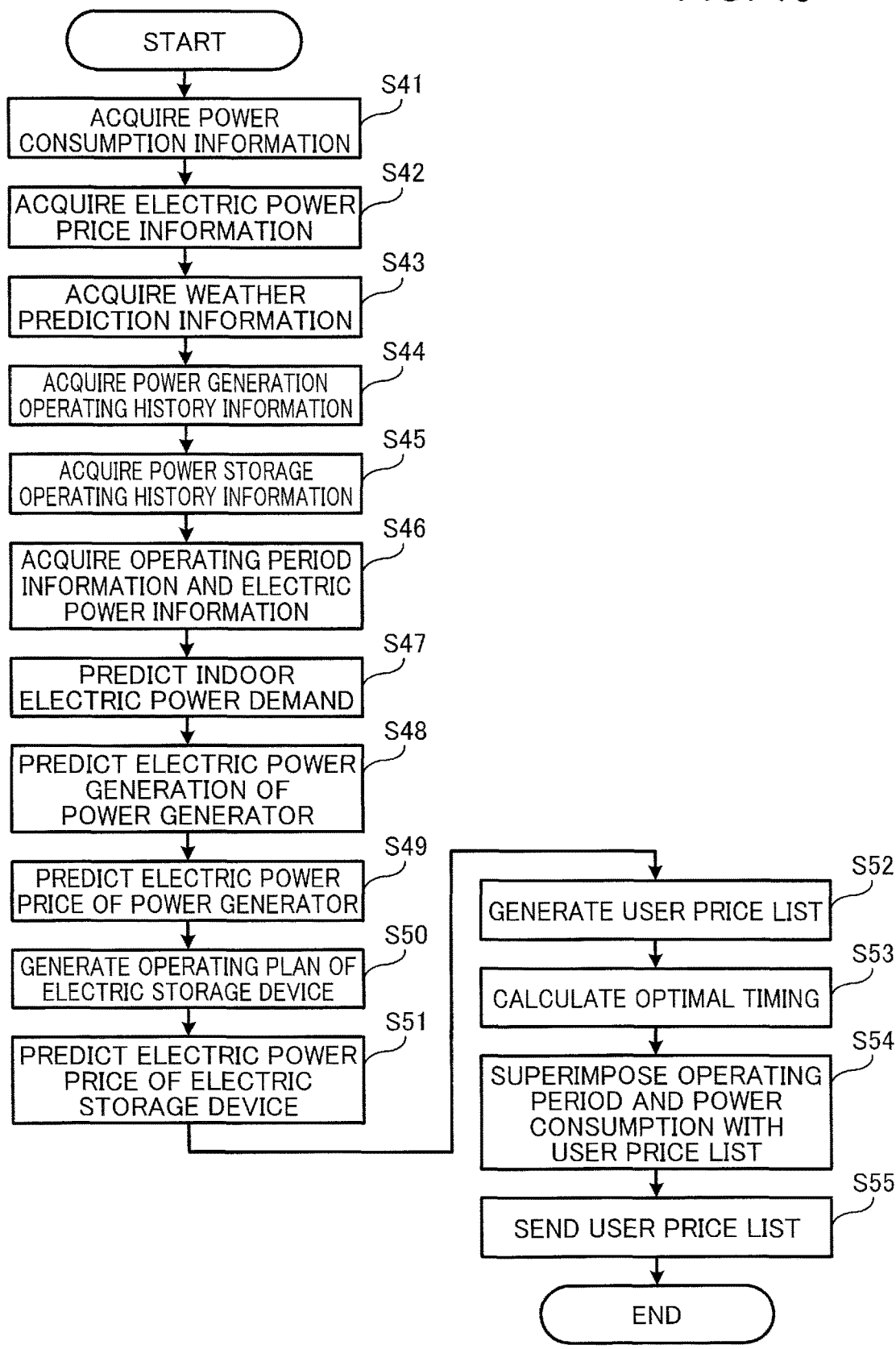
FIG. 16 is a flowchart explaining the operation of the energy management device according to embodiment 2 of the present invention.

FIG. 16 is a flowchart explaining the operation of the energy management device according to embodiment 2 of the present invention.

Since the processing of step S41 to step S45 is the same as the processing of step S11 to step S15 of FIG. 3, the explanation thereof is omitted.

In step S46, the communication unit 130 receives, from the electronic device 17, electric power information which indicates the operating period information which indicates the period that the electronic device 17 needs to be operated and the electric power information which indicates the electric power required for operating the electronic device 17. The operating information input unit 175 of the electronic device 17 accepts the input of the operating information of the electronic device 17 from the user. Subsequently, the communication unit 176 sends, to the energy management device 10, the operating period information and the electric power information that were input by the operating information input unit 175. The communication unit 130 of the electronic device 17 outputs the received operating period information and electric power information to the optimal timing calculation unit 109.

Note that, in embodiment 2, while the electronic device 17 accepts the input of the operating period information and the electric power information, the present invention is not limited thereto, and the user terminal 16 may also accept the input of the operating period information and the electric power information.

Since the processing of step S47 to step S52 is the same as the processing of step S16 to step S21 in FIG. 3, the explanation thereof is omitted.

In step S53, the optimal timing calculation unit 109 calculates, as the optimal timing, the operating start time in which the price of the electric power that is used when the electronic device 17 is operated becomes the least expensive price based on the operating period information and the electric power information received by the communication unit 130 and the user price list generated by the user price list generation unit 107.

Subsequently, in step S54, the optimal timing superimposing unit 110 acquires the user price list from the user price list generation unit 107, acquires the operating start time from the optimal timing calculation unit 109, and superimposes, on the user price list, the operating period and the electric energy that is required for operating the electronic device 17.

The optimal timing superimposing unit 110 superimposes the operating period and the electric energy that is required for the operation on the display position that is identified by the user price list, the operating start time, the operating period and the electric energy that is required for the operation. Here, the optimal timing superimposing unit 110 superimposes, on the user price list, the operating region which indicates the operating period and the electric energy that is required for operating the electronic device 17 in a distinguishable manner. The optimal timing superimposing unit 110 output, to the user price list generation unit 107, the user price list which was superimposed with the operating period and the electric energy that is required for operating the electronic device 17, and the user price list generation unit 107 outputs, to the communication unit 130, the user price list which was superimposed with the operating period and the electric energy that is required for operating the electronic device 17.

Subsequently, in step S55, the communication unit 130 sends, to the user terminal 16, the user price list that was output from the user price list generation unit 107.

Note that, since the operation of the user terminal 16 according to embodiment 2 is the same as the operation of the user terminal 16 according to embodiment 1, the explanation thereof is omitted.

Figure 17:
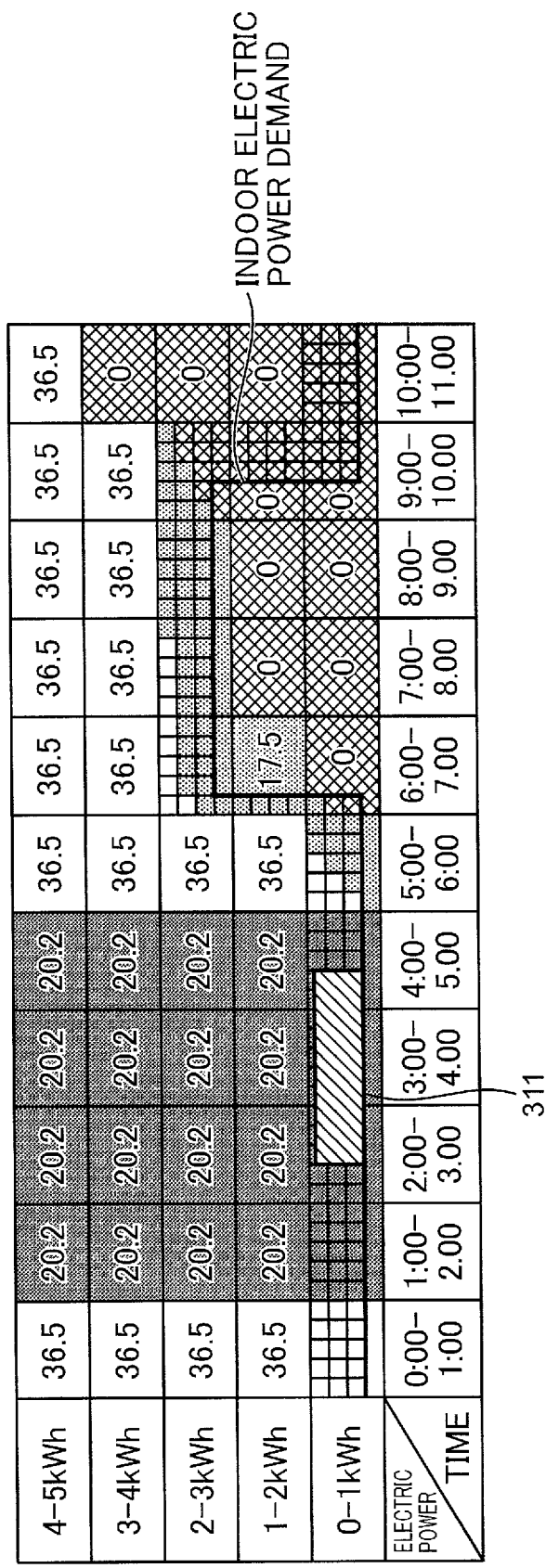
FIG. 17 is a diagram showing an example of the user price list that is generated in embodiment 2 of the present invention.

FIG. 17 is a diagram showing an example of the user price list that is generated in embodiment 2 of the present invention.

As shown in FIG. 17, the optimal timing superimposing unit 110 superimposes, on the user price list, the operating region 311 which indicates the operating period and the electric energy required for operating the electronic device 17 in a distinguishable manner.

Note that the operating region 311 can be moved in the same manner as the operating change region 301 explained in embodiment 1. In other words, the user can select the operating region 311 by using, for example, an operation button, a touch panel, a keyboard or a mouse, and move the selected operating region 311 to the intended position. The operating region 311 is the optimal timing that was automatically calculated by the energy management device 10. Thus, this does not reflect the user's convenience and is not necessarily an operation during the user's desired hours. Thus, the user's convenience can be improved by accepting the change of the operating region 311 that was calculated by the energy management device 10.

Moreover, the user price list generation unit 107 may also display the electric power price of a portion of the user price list corresponding to the prediction result of the electric power demand, for each time block that is more detailed than the predetermined time block. In particular, the user price list generation unit 107 may generate a user price list, in which the accuracy of the electric power price of a column to which the operating region 311 can be moved has been improved, based on the indoor electric power demand, and the electric energy that is required for operating the electronic device 17. In other words, the user price list generation unit 107 may generate a user price list in which the column to which the operating region 311 can be moved is additionally divided into a plurality of columns.

As shown in FIG. 17, for example, one column to which the operating region 311 can be moved is divided into four columns in the direction indicating the electric power usage, and divided into five columns in the direction indicating the time. Consequently, the electric power price that was indicated for each hour and for each 1 kWh can now be indicated for each 12 minutes and for each 0.25 kWh. Consequently, the user can move the operating time of the electronic device 17 in more detail, and the user's convenience can thereby be improved.

Note that the information processing system 3 according to embodiment 2 does not need to comprise the user terminal 16, and the electronic device 17 may comprise the function of the user terminal 16.

Embodiment 3

The information processing system according to embodiment 3 is now explained. The information processing system according to embodiment 3 generates a user price list which reflects the electric power supply/demand status.

Figure 18:
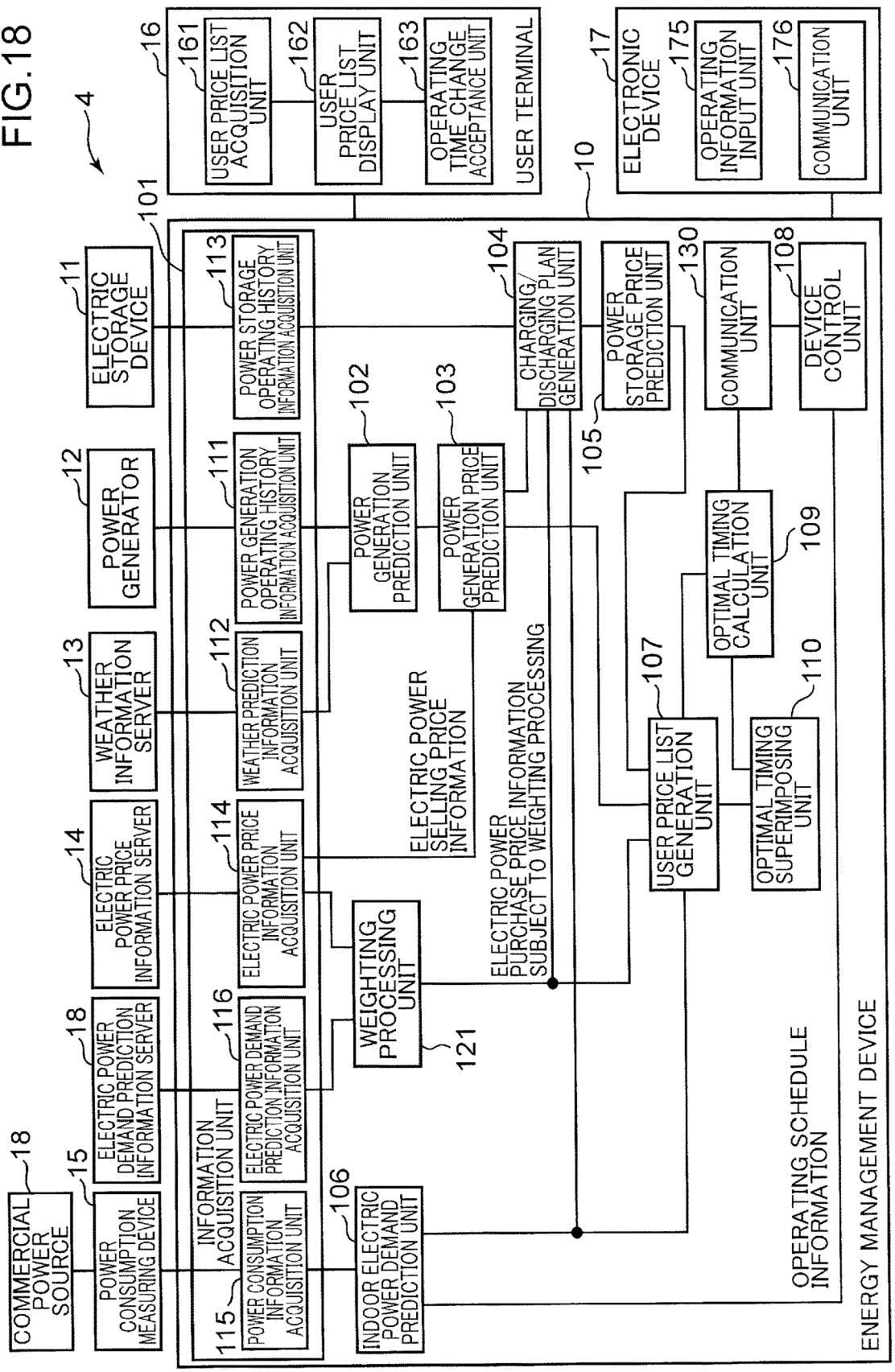
FIG. 18 is a diagram showing the configuration of the information processing system according to embodiment 3 of the present invention.

FIG. 18 is a diagram showing the configuration of the information processing system according to embodiment 3 of the present invention. The information processing system 4 shown in FIG. 18 comprises an energy management device 10, an electric storage device 11, a power generator 12, a weather information server 13, an electric power price information server 14, a power consumption measuring device 15, a user terminal 16, an electronic device 17 and an electric power demand prediction information server 19.

The energy management device 10 comprises an information acquisition unit 101, a power generation prediction unit 102, a power generation price prediction unit 103, a charging/discharging plan generation unit 104, a power storage price prediction unit 105, an indoor electric power demand prediction unit 106, a user price list generation unit 107, a device control unit 108, an optimal timing calculation unit 109, an optimal timing superimposing unit 110, a weighting processing unit 121 and a communication unit 130. The electronic device 17 comprises an operating information input unit 175 and a communication unit 176. Note that, in embodiment 3, the same configuration as the information processing systems 1 to 3 according to embodiments 1 and 2 is given the same reference numeral, and the explanation thereof is omitted.

The price determination unit 100 is configured from a power generation prediction unit 102, a power generation price prediction unit 103, a charging/discharging plan generation unit 104, a power storage price prediction unit 105, an indoor electric power demand prediction unit 106 and a weighting processing unit 121. Note that the price determination unit 100 is omitted in FIG. 18.

The electric power demand prediction information server 19 stores electric power demand prediction information which indicates the future electric power demand and the time change of the electric power supply capacity, and sends the electric power demand prediction information to the energy management device 10. Note that the electric power demand prediction information includes, for example, a power usage ratio which is the ratio of the total electric energy that can be supplied to a predetermined territory, including the user's home, from the commercial power source 18 of a predicted value of the total electric power usage to be used in the predetermined territory for each predetermined time (for example, every hour) of the following day. Moreover, the electric power demand prediction information is created for each territory, and distributes the electric power demand prediction information according to the territory where the user lives.

The information acquisition unit 101 comprises a power generation operating history information acquisition unit 111, a weather prediction information acquisition unit 112, a power storage operating history information acquisition unit 113, an electric power price information acquisition unit 114, a power consumption information acquisition unit 115 and an electric power demand prediction information acquisition unit 116.

The electric power demand prediction information acquisition unit 116 acquires, from the electric power demand prediction information server 19, the electric power demand prediction information indicating the future electric power demand and the time change of the electric power supply capacity.

The weighting processing unit 121 performs weighting processing, so that the price increases, to the electric power purchase price of a time block in which the power usage ratio contained in the electric power demand prediction information acquired by the electric power demand prediction information acquisition unit 116 is a predetermined value (for instance, 95%) or higher among the electric power purchase prices for each predetermined time contained in the electric power price information acquired by the electric power price information acquisition unit 114. The weighting processing unit 121 outputs the electric power purchase price information, which was subject to the weighting processing, to the charging/discharging plan generation unit 104 and the user price list generation unit 107. Moreover, the weighting processing unit 121 may also perform weighting at a ratio according to the power usage ratio.

The charging/discharging plan generation unit 104 generates an operation plan of the electric storage device 11 based on the operating history information of the electric storage device 11 acquired by the power storage operating history information acquisition unit 113, the electric power purchase price subject to the weighting processing by the weighting processing unit 121, the indoor electric power demand predicted by the indoor electric power demand prediction unit 106, and the allocation, to "storage of the generated electric power in the electric storage device 11", of the electric power generated based on the generated power operating plan generated by the power generation price prediction unit 103.

The user price list generation unit 107 generates a user price list which indicates, for each predetermined electric power usage and for each predetermined time block, the price of electric power that is used by the electronic device 17 based on the electric power purchase price subject to the weighting processing by the weighting processing unit 121, the performance index information of the electric power generated by the power generator 12 which was predicted by the power generation price prediction unit 103, and the electric power price upon using the electric power stored in the electric storage device 11 which was predicted by the power storage price prediction unit 105.

The operation of the information processing system 4 according to embodiment 3 of the present invention is now explained.

Figure 19:
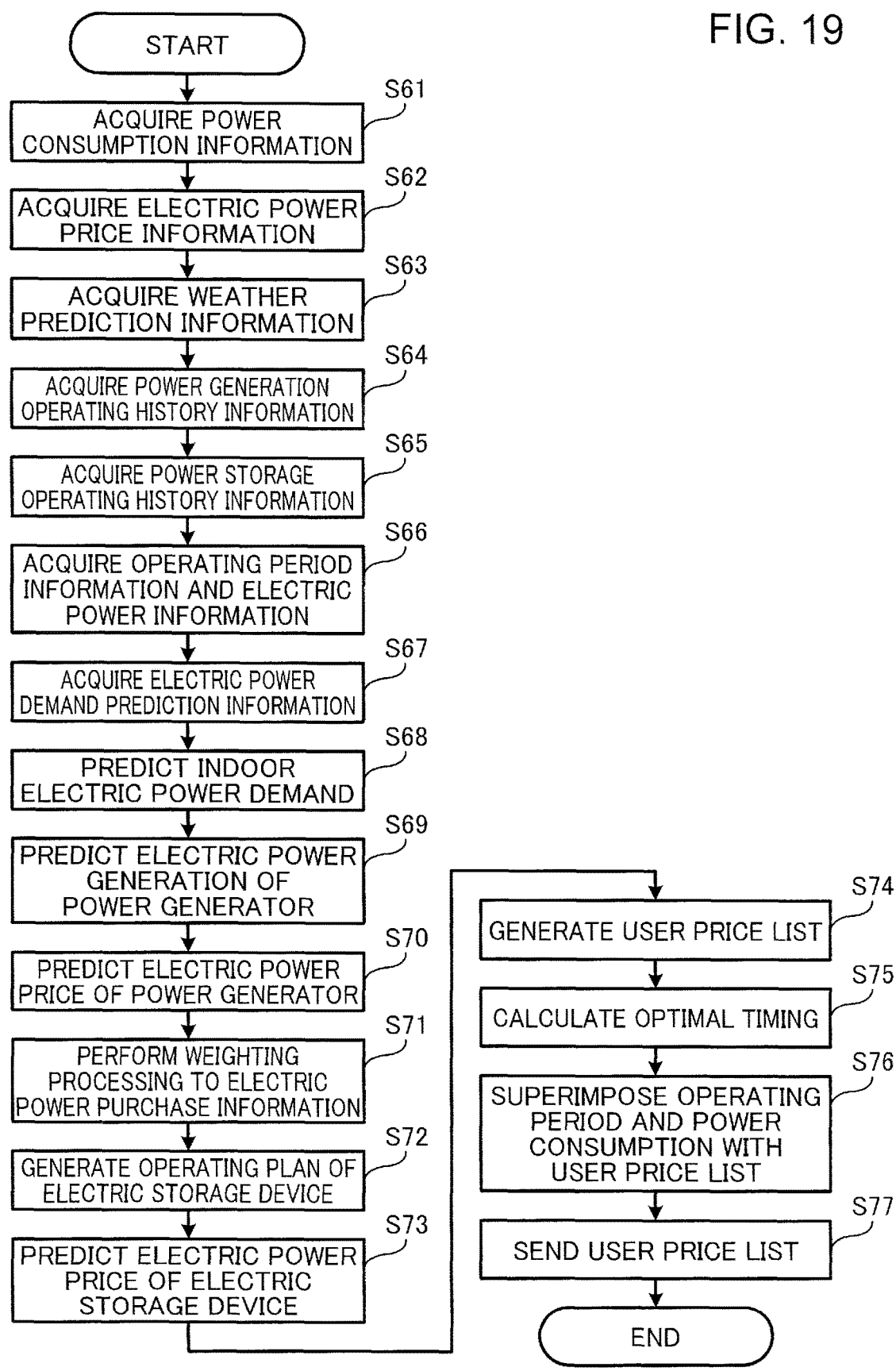
FIG. 19 is a flowchart explaining the operation of the energy management device according to embodiment 3 of the present invention.

FIG. 19 is a flowchart explaining the operation of the energy management device according to embodiment 3 of the present invention.

Since the processing of step S61 to step S66 is the same as the processing of step S41 to step S46 in FIG. 16, the explanation thereof is omitted.

Subsequently, in step S67, the electric power demand prediction information acquisition unit 116 acquires, from the electric power demand prediction information server 19, the electric power demand prediction information indicating the future electric power demand and the time change of the electric power supply capacity. The electric power demand prediction information acquisition unit 116 acquires a power usage ratio which is the ratio of the total electric energy that can be supplied to a predetermined territory, including the user's home, from the commercial power source 18 of a predicted value of the total electric power usage to be used in the predetermined territory for each predetermined time (for example, every hour) of the following day.

Since the processing of step S68 to step S70 is the same as the processing of step S47 to step S49 in FIG. 16, the explanation thereof is omitted.

Subsequently, in step S71, the weighting processing unit 121 performs weighting processing to the electric power purchase price of a time block in which the power usage ratio contained in the electric power demand prediction information acquired by the electric power demand prediction information acquisition unit 116 is a predetermined value (for instance, 95%) or higher among the electric power purchase prices for each predetermined time contained in the electric power price information acquired by the electric power price information acquisition unit 114. More specifically, the weighting processing unit 121 adds or multiplies a predetermined weighting value to the electric power purchase price of a time block in which, for example, the power usage ratio is 95% or higher.

Since the processing of step S72 is the same as the processing of step S50 in FIG. 16, the explanation thereof is omitted.

Subsequently, in step S73, the power storage price prediction unit 105 predicts, for each predetermined time block, the electric power price when the electric power stored in the electric storage device 11 is used by computing the substantial unit price of the electric power stored in the electric storage device 11 based on the electric power purchase price subject to the weighting processing by the weighting processing unit 121, the electric power generation for each predetermined time block of the power generator 12 which was predicted by the power generation prediction unit 102, the electric power price of the electric power generated by the power generator 12 which was predicted by the power generation price prediction unit 103, and the electric energy charged or discharged based on the charging/discharging plan of the electric storage device 11 which was generated by the charging/discharging plan generation unit 104.

Subsequently, in step S74, the user price list generation unit 107 generates a user price list which indicates, for each predetermined electric power usage and for each predetermined time block, the price of the electric power used by the electronic device 17 based on the electric power purchase price subject to the weighting processing by the weighting processing unit 121, the electric power price of the electric power generated by the power generator 12 which was predicted by the power generation price prediction unit 103, and the electric power price upon using the electric power stored in the electric storage device 11 which was predicted by the power storage price prediction unit 105.

Since the processing of step S75 to step S77 is the same as the processing of step S53 to step S55 in FIG. 16, the explanation thereof is omitted. Moreover, since the operation of the user terminal 16 according to embodiment 3 is the same as the operation of the user terminal 16 according to embodiment 1, the explanation thereof is omitted.

Figure 20:
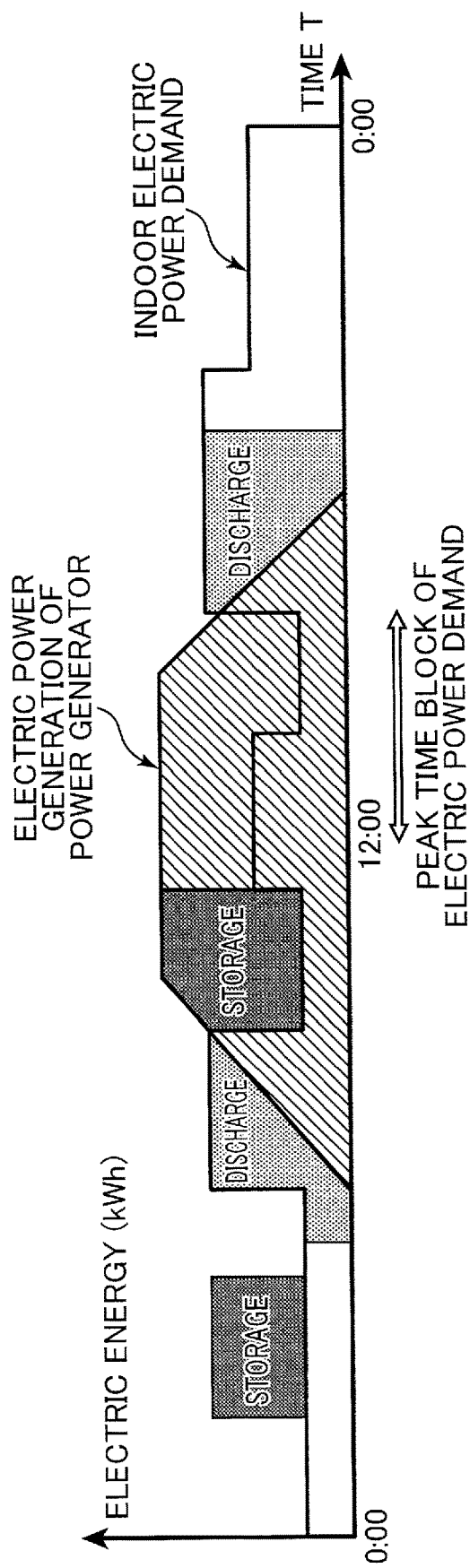
FIG. 20 is a diagram showing an example of the time change of the electric power generation of the power generator and the charging/discharging plan and the indoor electric power demand of the electric storage device in embodiment 3 of the present invention.
Figure 21:
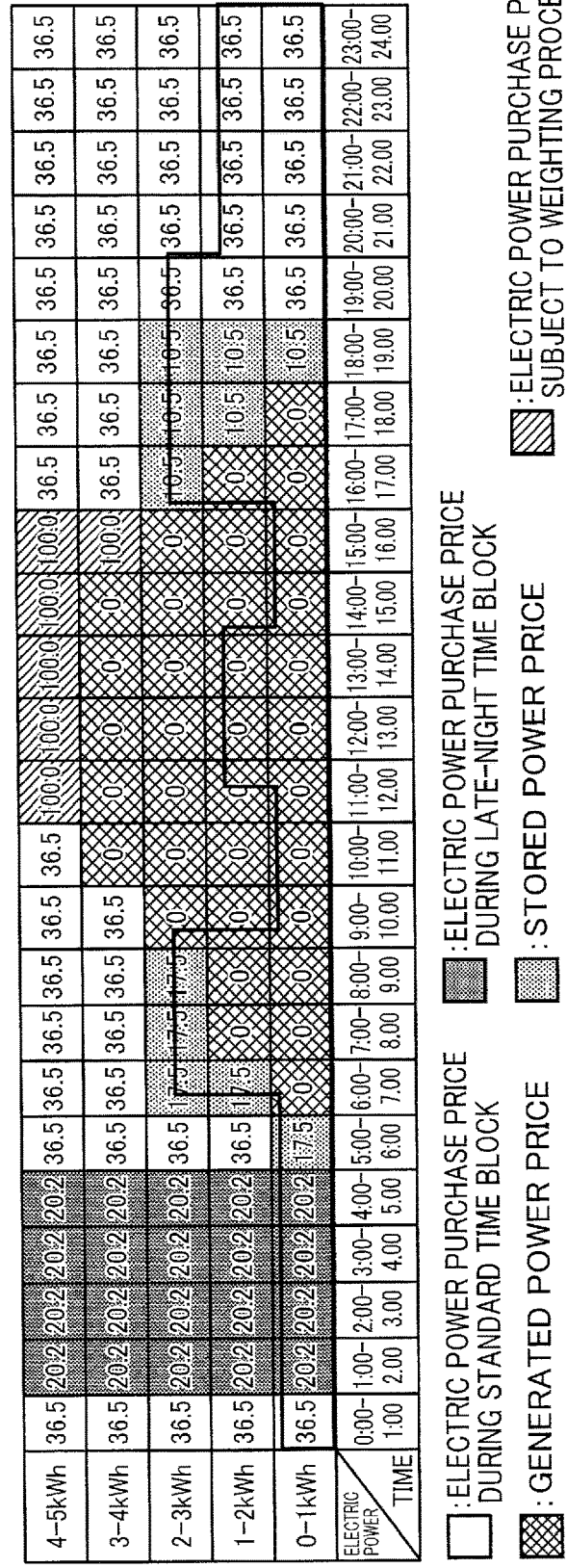
FIG. 21 is a diagram showing an example of the user price list in embodiment 3 of the present invention.

FIG. 20 is a diagram showing an example of the time change of the electric power generation of the power generator and the charging/discharging plan and the indoor electric power demand of the electric storage device in embodiment 3 of the present invention. FIG. 21 is a diagram showing an example of the user price list in embodiment 3 of the present invention. Note that the user price list shown in FIG. 21 was generated from the prediction result shown in FIG. 20.

The time change of the electric power generation of the power generator, the charging/discharging plan of the electric storage device and the indoor electric power demand in embodiment 3 shown in FIG. 20 are the same as the time change of the electric power generation of the power generator, the charging/discharging plan of the electric storage device and the indoor electric power demand in embodiment 1 shown in FIG. 9.

As shown in FIG. 20, in embodiment 3, the time block from 12:00 to 16:00 is the time block in which the electric power demand reaches its peak, and the power usage ratio of the time block from 12:00 to 16:00 is set to be a predetermined value or higher.

In the foregoing case, the weighting processing unit 121 performs weighting processing to an electric power purchase price of a time block (12:00 to 16:00) in which, for example, the power usage ratio is 95% or higher. For example, the weighting processing unit 121 adds the weighting value of 63.5 yen/kWh to 36.5 yen/kWh, which is the electric power purchase price of the time block of 12:00 to 16:00. Consequently, the weighting processing unit 121 changes the electric power purchase price of the time block of 12:00 to 16:00 to 100.0 yen/kWh.

Consequently, as shown in FIG. 21, the electric power purchase price corresponding to the electric power usage of 4 to 5 kWh in the time block of 11:00 to 12:00, the time block of 12:00 to 13:00, the time block of 13:00 to 14:00, the time block of 14:00 to 15:00 and the time block of 15:00 to 16:00, as well as the electric power usage of 3 to 4 kWh in the time block of 15:00 to 16:00 becomes 100.0 yen/kWh.

As described above, with the information processing system according to embodiment 3, since it is possible to generate a user price list which reflects the electric power demand prediction and the user can confirm a user price list which reflects the electric power demand prediction, it is possible to suppress the use of electronic devices in a time block when the electric power demand is high; that is, in a time block in which power needs to be conserved in the territory where the user lives. Meanwhile, even in a time block when the electric power demand is high; that is, in a time block in which power needs to be conserved in the territory where the user lives, it is possible to determine that the electronic devices can be used when there is sufficient generated power of the power generator 12 and electronic devices can be used, or when there is sufficient electric power charged in the electric storage device 11 and electronic devices can be used.

Note that, in embodiment 3, while the electric power demand prediction information includes, for example, the power usage ratio of the commercial power source 18 for each predetermined time (for instance, every hour) of the following day, the present invention is not limited thereto, and the electric power demand prediction information may also include information which indicates the time block when a rolling blackout will take place. In other words, when a rolling blackout is to be performed for each territory, the electric power demand prediction information server 19 sends, to the energy management device 10, the electric power demand prediction information containing information which indicates the time block in which a blackout will take place.

Figure 22:
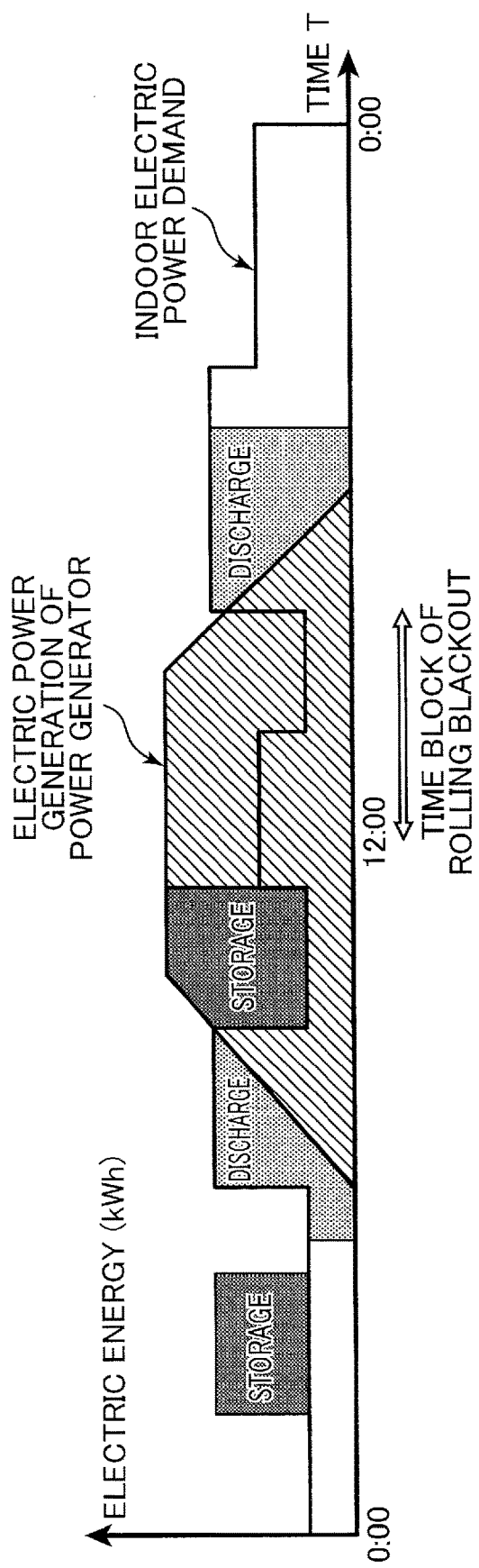
FIG. 22 is a diagram showing an example of the time change of the electric power generation of the power generator and the charging/discharging plan and the indoor electric power demand of the electric storage device according to a modified example of embodiment 3 of the present invention.
Figure 23:
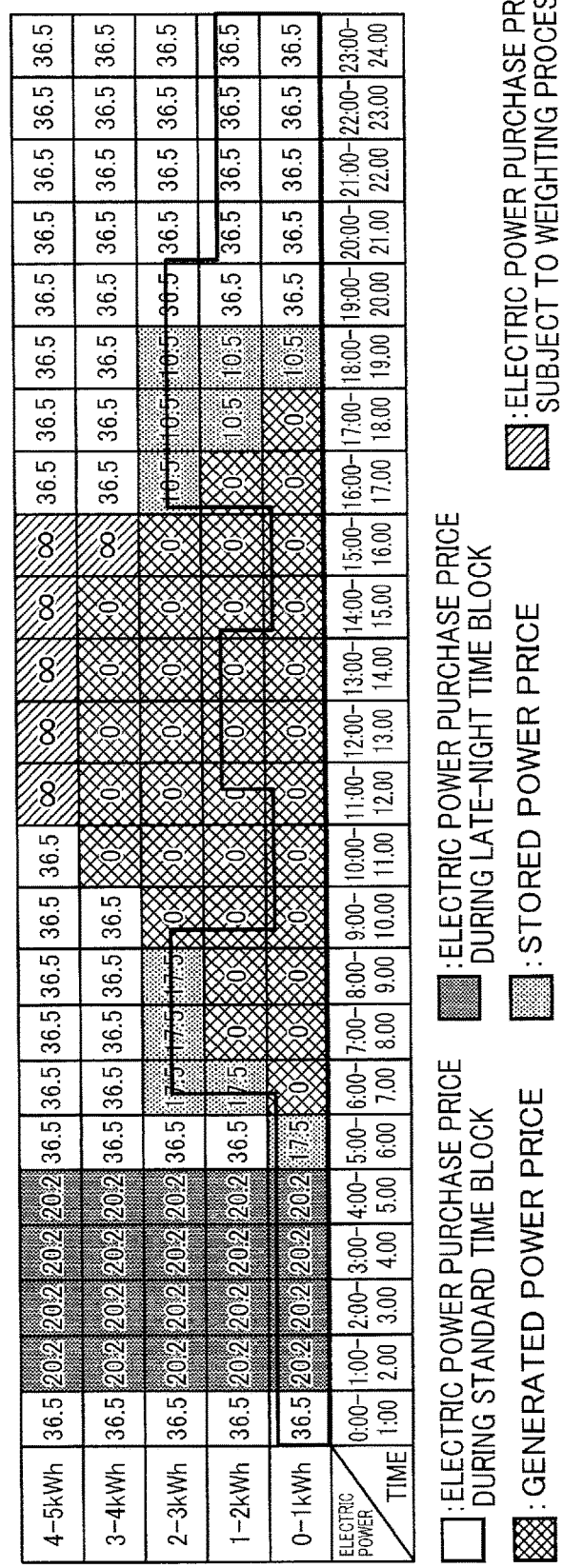
FIG. 23 is a diagram showing an example of the user price list according to a modified example of embodiment 3 of the present invention.

FIG. 22 is a diagram showing an example of the time change of the electric power generation of the power generator and the charging/discharging plan and the indoor electric power demand of the electric storage device according to a modified example of embodiment 3 of the present invention. FIG. 23 is a diagram showing an example of the user price list according to a modified example of embodiment 3 of the present invention. Note that the user price list shown in FIG. 23 was generated from the prediction result shown in FIG. 22.

The time change of the electric power generation of the power generator, the charging/discharging plan of the electric storage device and the indoor electric power demand in the modified example of embodiment 3 shown in FIG. 22 are the same as the time change of the electric power generation of the power generator, the charging/discharging plan of the electric storage device and the indoor electric power demand in embodiment 1 shown in FIG. 9.

As shown in FIG. 22, with the modified example of embodiment 3, the time block of 12:00 to 16:00 is the time block in which the rolling blackout will take place.

In the foregoing case, the weighting processing unit 121 performs weighting processing to the electric power purchase price of the time block (12:00 to 16:00) in which the blackout will take place. For example, the weighting processing unit 121 changes the electric power purchase price of the time block of 12:00 to 16:00 from the current 36.5 yen/kWh to ∞yen/kWh (∞ means infinite).

Consequently, as shown in FIG. 23, the electric power purchase price corresponding to the electric power usage of 4 to 5 kWh in the time block of 11:00 to 12:00, the time block of 12:00 to 13:00, the time block of 13:00 to 14:00, the time block of 14:00 to 15:00, and the time block of 15:00 to 16:00, as well as the electric power usage of 3 to 4 kWh in the time block of 15:00 to 16:00 becomes ∞yen/kWh. Here, since electric power in which the electric power purchase price is ∞yen/kWh essentially cannot be used, the operating time change acceptance unit 163 of this embodiment does not accept the change in the operating time of the electronic device 17 to a time block in which the power consumption of the electronic device 17 becomes ∞yen/kWh in the user price list.

As described above, with the information processing system according to the modified example of embodiment 3, since it is possible to generate a user price list which reflects a blackout and the user can confirm a user price list which reflects a blackout, it is possible to prevent an operating time of the electronic device from being set in a time block in which the blackout of the commercial power source 18 will take place. Meanwhile, even in a time block in which the blackout of the commercial power source 18 will take place, it is possible to determine that the electronic devices can be used when there is sufficient generated power of the power generator 12 and electronic devices can be used, or when there is sufficient electric power charged in the electric storage device 11 and electronic devices can be used.

Note that, in FIG. 23, while the symbol of ∞ which indicates an infinite price is indicated in the user price list, the present invention is not limited thereto, and it is also possible to indicate that the electric power cannot be used by color coding or with a different symbol without indicating the symbol of ∞ in the user price list.

Note that the information processing system 4 according to embodiment 3 does not need to comprise the user terminal 16, and the electronic device 17 may comprise the function of the user terminal 16.

Embodiment 4

The information processing system according to embodiment 4 is now explained. The information processing system according to embodiment 4 generates a user price list which reflects the environmental load upon generating power with the commercial power source 18.

Figure 24:
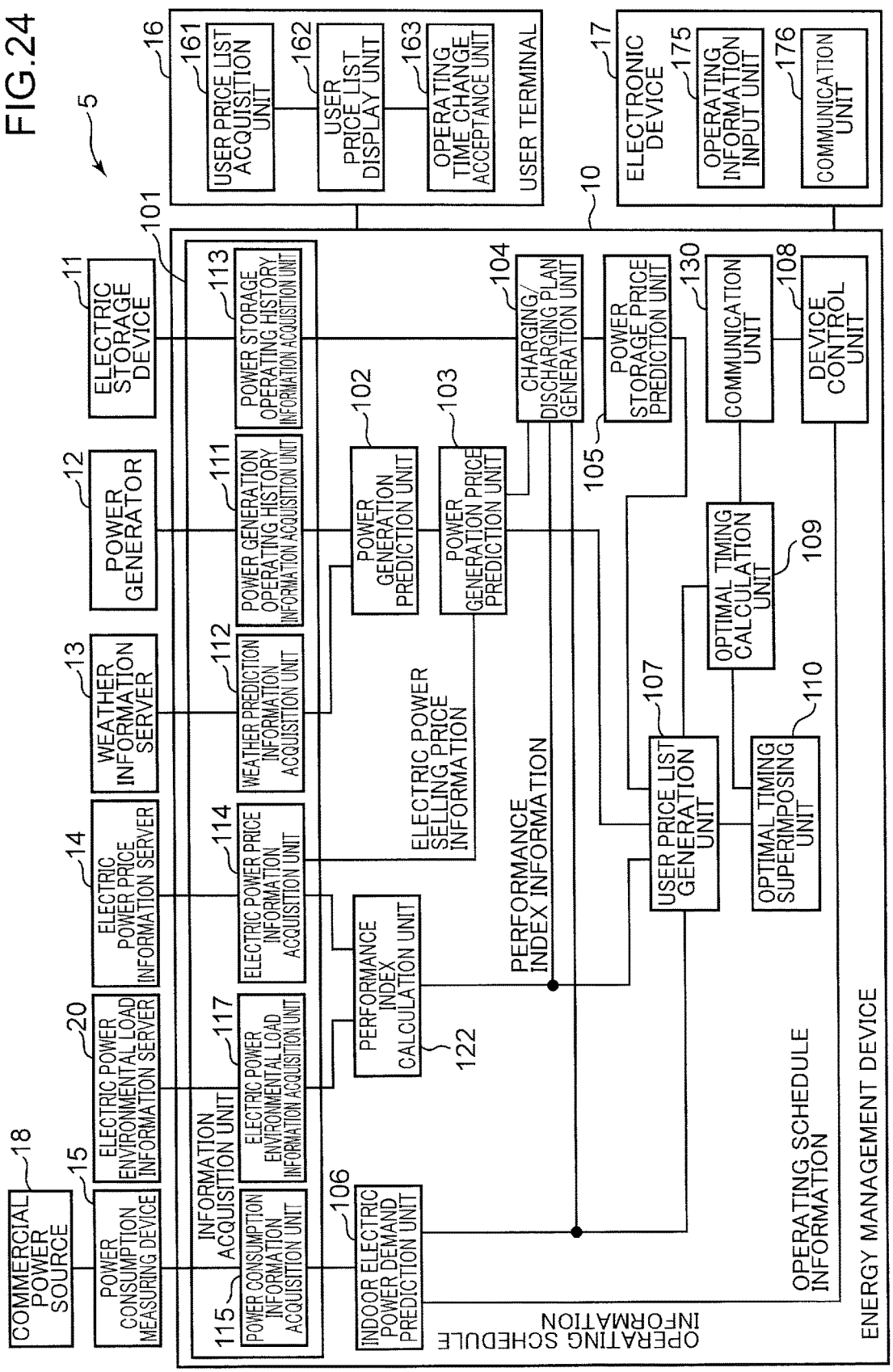
FIG. 24 is a diagram showing the configuration of the information processing system according to embodiment 4 of the present invention.

FIG. 24 is a diagram showing the configuration of the information processing system according to embodiment 4 of the present invention. The information processing system 5 shown in FIG. 24 comprises an energy management device 10, an electric storage device 11, a power generator 12, a weather information server 13, an electric power price information server 14, a power consumption measuring device 15, a user terminal 16, an electronic device 17 and an electric power environmental load information server 20.

The energy management device 10 comprises an information acquisition unit 101, a power generation prediction unit 102, a power generation price prediction unit 103, a charging/discharging plan generation unit 104, a power storage price prediction unit 105, an indoor electric power demand prediction unit 106, a user price list generation unit 107, a device control unit 108, an optimal timing calculation unit 109, an optimal timing superimposing unit 110, a performance index calculation unit 122 and a communication unit 130. The electronic device 17 comprises an operating information input unit 175 and a communication unit 176. Note that, in embodiment 4, the same configuration as the information processing systems 1 to 4 according to embodiments 1 to 3 is given the same reference numeral, and the explanation thereof is omitted.

The price determination unit 100 is configured from a power generation prediction unit 102, a power generation price prediction unit 103, a charging/discharging plan generation unit 104, a power storage price prediction unit 105, an indoor electric power demand prediction unit 106 and a performance index calculation unit 122. Note that the price determination unit 100 is omitted in FIG. 24.

The electric power environmental load information server 20 stores electric power environmental load information which indicates the environmental load upon generating power with the commercial power source 18, and sends the electric power environmental load information to the energy management device 10. Note that the electric power environmental load information includes the time change of the carbon dioxide emission converted value which is obtained by converting the electric power generated by the commercial power source 18 into a carbon dioxide emission.

The information acquisition unit 101 comprises a power generation operating history information acquisition unit 111, a weather prediction information acquisition unit 112, a power storage operating history information acquisition unit 113, an electric power price information acquisition unit 114, a power consumption information acquisition unit 115 and an electric power environmental load information acquisition unit 117.

The electric power environmental load information acquisition unit 117 acquires, from the electric power environmental load information server 20, the electric power environmental load information which indicates the environmental load upon generating power with the commercial power source 18.

The performance index calculation unit 122 normalizes the electric power environmental load information acquired by the electric power environmental load information acquisition unit 117, normalizes the electric power purchase price information contained in the electric power price information acquired by the electric power price information acquisition unit 114, and calculates performance index information obtained by synthesizing, at a predetermined ratio, the normalized electric power environmental load information and the normalized electric power purchase price information. The performance index calculation unit 122 outputs the calculated performance index information to the charging/discharging plan generation unit 104 and the user price list generation unit 107.

Moreover, as with the case of embodiment 1, the power generation price prediction unit 103 of embodiment 4 generates a generated power operating plan of the electric power generated by the power generator 12, calculates the electric power price of the generated electric power, and calculates, in relation to the electric power generated by the power generator 12, a performance index similar to the performance index related to the commercial power source 18 calculated by the performance index calculation unit 122.

Let it be assumed that, in the foregoing case, the electric power environmental load information of the electric power generated by the power generator 12 has been set in advance in accordance with the type of power generator. For example, when the power generator 12 is a type that uses natural energy such as a solar power generator, a wind power generator, a water power generator or a geothermal power generator, the carbon dioxide emission converted value contained in that electric power environmental load information will be extremely small.

As with the case of embodiment 1, the power generation price prediction unit 103 of embodiment 4 calculates the electric power price when the electric power generated by the power generator 12 is used, additionally normalizes the calculated electric power price, normalizes the electric power environmental load information of the electric power generated by the power generator 12, and calculates the performance index information by synthesizing, at a predetermined ratio, the normalized electric power environmental load information and the normalized electric power price.

Moreover, the charging/discharging plan generation unit 104 of embodiment 4 generates an operation plan for the charging operation and the discharging operation of the electric storage device 11 based on the operating history information of the electric storage device 11 acquired by the power storage operating history information acquisition unit 113, the performance index information calculated by the performance index calculation unit 122, the indoor electric power demand predicted by the indoor electric power demand prediction unit 106, and the allocation, to "storage of the generated electric power in the electric storage device 11", of the electric power generated based on the generated power operating plan generated by the power generation price prediction unit 103.

Moreover, the power storage price prediction unit 105 of embodiment 4 predicts, for each predetermined time block, the performance index information when the electric power stored in the electric storage device 11 is used by computing the performance index information of the electric power charged in the electric storage device 11 based on the performance index information of the electric power supplied from the commercial power source 18 which was calculated by the performance index calculation unit 122, the electric power generation for each predetermined time block of the power generator 12 which was predicted by the power generation prediction unit 102, the performance index information of the electric power generated by the power generator 12 which was predicted by the power generation price prediction unit 103, and the electric energy charged or discharged based on the charging/discharging plan of the electric storage device 11 which was generated by the charging/discharging plan generation unit 104.

The user price list generation unit 107 generates a user price list which indicates, for each predetermined electric power usage and for each predetermined time block, the performance index information calculated by the performance index calculation unit 122, the performance index information of the electric power generated by the power generator 12 which was predicted by the power generation price prediction unit 103, and the performance index information upon using the electric power stored in the electric storage device 11 which was predicted by the power storage price prediction unit 105.

The operation of the information processing system 5 according to embodiment 4 is now explained.

Figure 25:
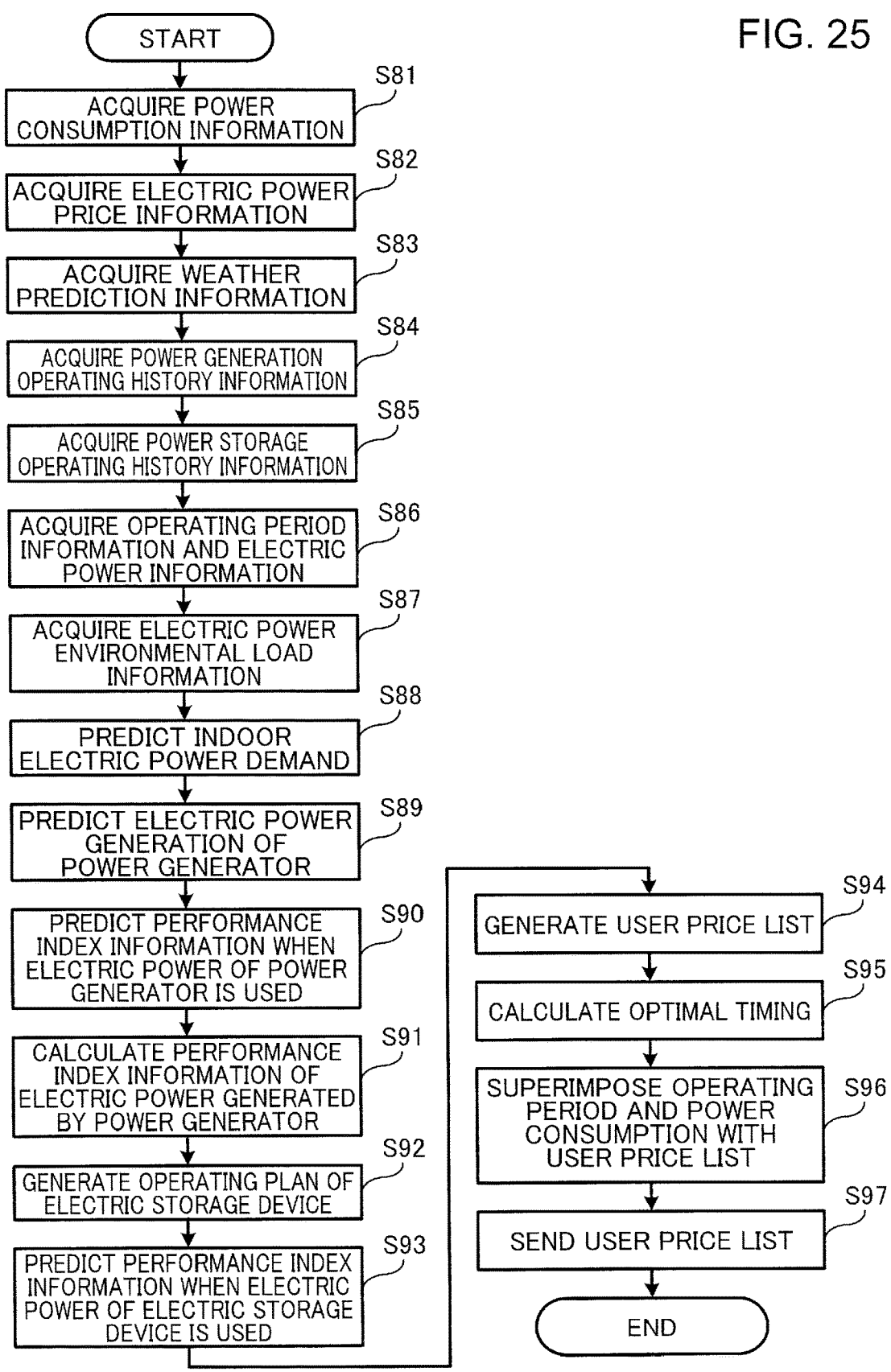
FIG. 25 is a flowchart explaining the operation of the energy management device according to embodiment 4 of the present invention.

FIG. 25 is a flowchart explaining the operation of the energy management device according to embodiment 4 of the present invention.

Since the processing of step S81 to step S86 is the same as the processing of step S41 to step S46 in FIG. 16, the explanation thereof is omitted.

Subsequently, in step S87, the electric power environmental load information acquisition unit 117 acquires, from the electric power environmental load information server 20, the electric power environmental load information which indicates the environmental load upon generating power with the commercial power source 18. More specifically, the electric power environmental load information acquisition unit 117 acquires the time change of the carbon dioxide emission converted value which is obtained by converting the electric power generated by the commercial power source 18 into a carbon dioxide emission.

Since the processing of step S88 to step S89 is the same as the processing of step S47 to step S48 in FIG. 16, the explanation thereof is omitted.

Subsequently, in step S90, as with the case of embodiment 1, the power generation price prediction unit 103 calculates the electric power price when the electric power generated by the power generator 12 is used, and additionally normalizes the calculated electric power price, normalizes the carbon dioxide emission converted value of the electric power generated by the power generator 12, and predicts the performance index information by synthesizing, at a predetermined ratio, the normalized carbon dioxide emission converted value and the normalized electric power price.

Subsequently, in step S91, the performance index calculation unit 122 normalizes the carbon dioxide emission converted value acquired by the electric power environmental load information acquisition unit 117, normalizes the electric power purchase price information contained in the electric power price information acquired by the electric power price information acquisition unit 114, and calculates the performance index information by synthesizing, at a predetermined ratio, the normalized carbon dioxide emission converted value and the normalized electric power purchase price information.

Note that, in embodiment 4, calculated is performance index information obtained by synthesizing, for example, at a ratio of 2:8, the normalized carbon dioxide emission converted value and the normalized price information. This synthesizing ratio may be set in advance, or set by the user via the user terminal 16. When the synthesizing ratio is set by the user, performance index information based on a ratio that is valued by the user in relation to "environmental load" and "price" is calculated.

Since the processing of step S92 is the same as the processing of step S50 in FIG. 16, the explanation thereof is omitted.

Subsequently, in step S93, the power storage price prediction unit 105 predicts, for each predetermined electric power usage and for each predetermined time block, the performance index information when the electric power stored in the electric storage device 11 is used by computing the performance index information of the electric power charged in the electric storage device 11 based on the performance index information of the electric power supplied from the commercial power source 18 which was calculated by the performance index calculation unit 122, the electric power generation for each predetermined time block of the power generator 12 which was predicted by the power generation prediction unit 102, the performance index information of the electric power generated by the power generator 12 which was predicted by the power generation price prediction unit 103, and the electric energy charged or discharged based on the charging/discharging plan of the electric storage device 11 which was generated by the charging/discharging plan generation unit 104.

Subsequently, in step S94, the user price list generation unit 107 generates a user price list which indicates, for each predetermined electric power usage and for each predetermined time block, the performance index information of the electric power generated by the power generator 12 which was calculated by the performance index calculation unit 122, the performance index information of the electric power generated by the power generator 12 which was predicted by the power generation price prediction unit 103, and the performance index information upon using the electric power stored in the electric storage device 11 which was predicted by the power storage price prediction unit 105.

Since the processing of step S95 to step S97 is the same as the processing of step S53 to step S55 in FIG. 16, the explanation thereof is omitted. Moreover, since the operation of the user terminal 16 according to embodiment 4 is the same as the operation of the user terminal 16 according to embodiment 1, the explanation thereof is omitted.

Figure 26:
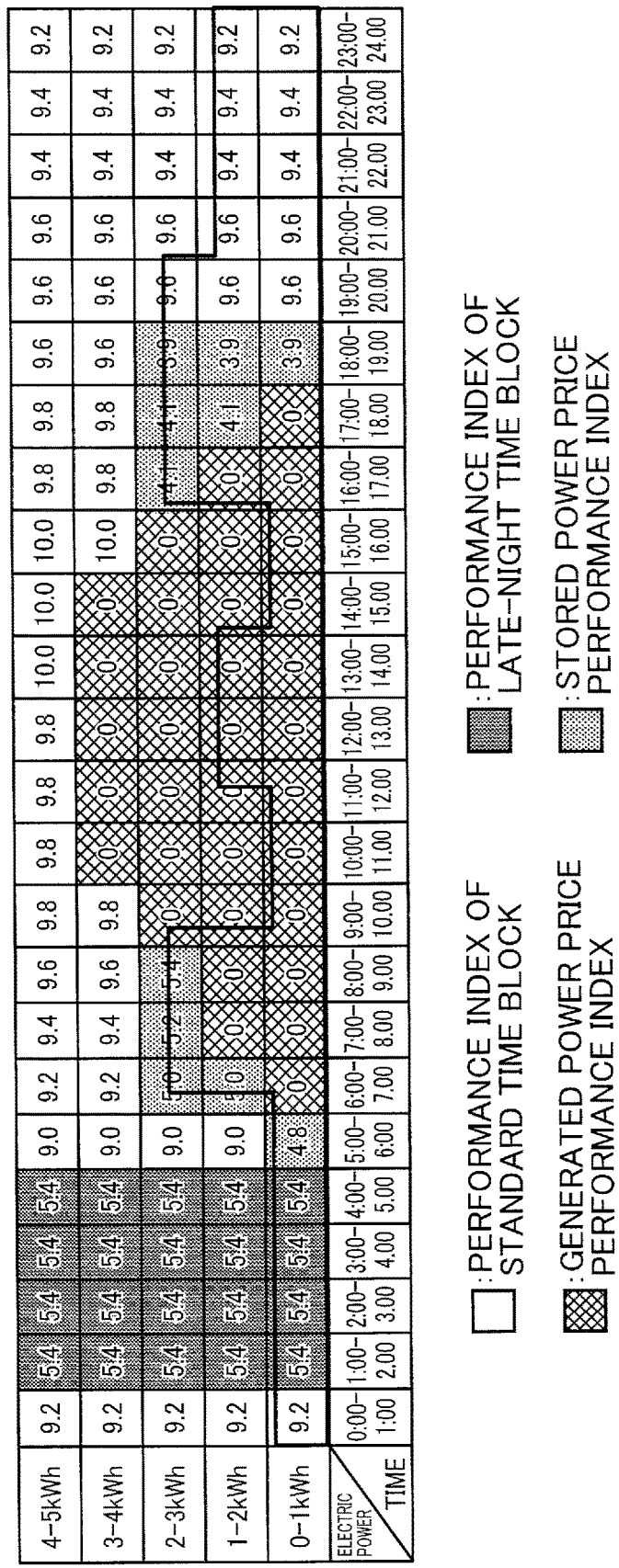
FIG. 26 is a diagram showing an example of the user price list in embodiment 4 of the present invention.

FIG. 26 is a diagram showing an example of the user price list in embodiment 4 of the present invention. Note that, in embodiment 4, the time change of the electric power generation of the power generator, the charging/discharging plan of the electric storage device and the indoor electric power demand are the same as the time change of the electric power generation of the power generator, the charging/discharging plan of the electric storage device and the indoor electric power demand in embodiment 1 shown in FIG. 9.

The carbon dioxide emission converted value of the electric power supplied from the commercial power source 18 will change depending on what kind of power generation means is used by the commercial power source 18 for supplying the electric power. In the case of the commercial power source 18 of the example shown in FIG. 26, since the ratio of using the power generation means with a high carbon dioxide emission converted value increases in the time block between 13:00 and 16:00, the performance index information of the electric power supplied from the commercial power source 18 in the time block between 13:00 and 16:00 will also increase. Moreover, in the case of the example shown in FIG. 26, the performance index information of the electric power generated by the power generator 12 becomes 0.

Thus, as shown in FIG. 26, the performance index of the standard time block becomes 9.2 to 10.0, the performance index of the late-night time block becomes 5.4, the performance index of the generated power of the power generator 12 becomes 0, and the performance index of the stored electric power of the electric storage device 11 becomes 3.9 to 5.4.

As described above, with the information processing system according to embodiment 4, since it is possible to generate a user price list which reflects the environmental load and the user can confirm the user price list which reflects the environmental load, electronic devices can be used in a time block with a low environmental load.

Note that the information processing system 5 according to embodiment 4 does not need to comprise the user terminal 16, and the electronic device 17 may comprise the function of the user terminal 16.

Note that the specific embodiments described above mainly include the invention which is configured as described below.

The information processing apparatus according to one embodiment of the present invention comprises an acquisition unit for acquiring information related to an electric power purchase price, which is an electricity cost when an electronic device is operated using electric power supplied from a commercial power source, a price determination unit for determining, for each time block, a generated power price which is an electricity cost when an electronic device is operated using generated power of a power generator for generating power using natural energy, and a stored power price which is an electricity cost when an electronic device is operated using electric power stored in an electric storage device, and an electric power price list generation unit for generating an electric power price list capable of displaying, with regard to an arbitrary time block, the electric power purchase price, the generated power price and the stored power price.

According to the foregoing configuration, since an electric power price list capable of displaying an electric power purchase price, which is an electricity cost when an electronic device is operated using electric power supplied from a commercial power source, a generated power price which is an electricity cost when an electronic device is operated using generated power of a power generator for generating power using natural energy, and a stored power price which is an electricity cost when an electronic device is operated using electric power stored in an electric storage device is generated, the user can comprehend the time block in which the electricity cost can be further reduced by confirming the generated electric power price list. Thus, it is possible to generate an electric power price list capable of achieving both user's convenience and user's profit.

Moreover, as an example of the foregoing information processing apparatus, the acquisition unit additionally acquires an operating history of the power generator, and an operating history of the electric storage device, the information processing apparatus further comprises an electric power generation prediction unit for predicting an electric power generation of the power generator by using the operating history of the power generator acquired by the acquisition unit, and an operation plan generation unit for generating an operation plan of the electric storage device by using the operating history of the electric storage device acquired by the acquisition unit, and the price determination unit includes a power generation price prediction unit for predicting the generated power price by using a predicted value of the electric power generation predicted by the electric power generation prediction unit, and a power storage price prediction unit for predicting the stored power price based on the electric power purchase price acquired by the acquisition unit, the generated power price predicted by the power generation price prediction unit, and the operation plan of the electric storage device generated by the operation plan generation unit.

According to the foregoing configuration, since an electric power price list which indicates, for each predetermined time block, an electric power purchase price, a predicted generated power price, and a predicted stored power price is generated, the user can comprehend the time block in which the electricity cost can be further reduced by confirming the generated electric power price list. Thus, it is possible to generate an electric power price list capable of achieving both user's convenience and user's profit.

Moreover, as an example of the foregoing information processing apparatus, the electric power price list generation unit generates an electric power price list which indicates a time block for which a most inexpensive price is designated among the electric power purchase price acquired by the acquisition unit, the generated power price predicted by the power generation price prediction unit, and the stored power price predicted by the power storage price prediction unit.

According to the foregoing configuration, since an electric power price list which indicates a time block for which a most inexpensive price is designated among an electric power purchase price, a predicted generated power price, and a predicted stored power price is generated, the user can comprehend the time block in which the electricity cost can be further reduced by confirming the generated electric power price list. Thus, it is possible to generate an electric power price list capable of achieving both user's convenience and user's profit.

Moreover, as an example of the foregoing information processing apparatus, the electric power price list generation unit additionally generates an electric power price list which indicates the most inexpensive price for each predetermined electric power usage.

According to the foregoing configuration, it is possible to generate an electric power price list which indicates, for each predetermined electric power usage, the most inexpensive price among the electric power purchase price upon purchasing electric power from a commercial power source, the generated power price upon using electric power generated by a power generator, and the stored power price upon using electric power stored in the electric storage device.

Moreover, as an example of the foregoing information processing apparatus, the electric power price list generation unit generates an electric power price list which indicates, for each predetermined time block, an electric power price in a case of preferentially using a less expensive electric power among the electric power supplied from the commercial power source, the electric power generated by the power generator, and the electric power stored in the electric storage device.

According to the foregoing configuration, since an electric power price list which indicates, for each predetermined time block, an electric power price in a case of preferentially using a less expensive electric power among the electric power supplied from the commercial power source, the electric power generated by the power generator, and the electric power stored in the electric storage device is generated, the user can comprehend the time block in which the electricity cost can be reduced the most by confirming the generated electric power price list. Thus, it is possible to generate an electric power price list capable of achieving both user's convenience and user's profit.

Moreover, as an example of the foregoing information processing apparatus, the acquisition unit acquires a use history of electric power used by an electronic device in a user's home, the information processing apparatus further comprises a demand prediction unit for predicting an electric power demand of the electronic device in the user's home by using the use history acquired by the acquisition unit, and the electric power price list generation unit superimposes, on the electric power price list, a prediction result of the electric power demand of the electronic device in the user's home predicted by the demand prediction unit.

According to the foregoing configuration, the acquisition unit acquires a use history of electric power used by an electronic device in a user's home. The demand prediction unit predicts an electric power demand of the electronic device in the user's home by using the use history acquired by the acquisition unit. The electric power price list generation unit superimposes, on the electric power price list, a prediction result of the electric power demand of the electronic device in the user's home predicted by the demand prediction unit.

Accordingly, since the prediction result of the electric power demand of the electronic device in the user's home is superimposed on the electric power price list, the user can simultaneously comprehend the electric power price and the prediction result of the electric power demand by confirming the generated electric power price list.

Moreover, as an example of the foregoing information processing apparatus, the electric power price list generation unit superimposes, on the electric power price list, together with the prediction result of the electric power demand, electric power required for operating a target electric device among the electronic devices in the user's home for which an operating time can be shifted, an operating time that the target electronic device is to be operated, and information indicating the target electronic device.

According to the foregoing configuration, the electric power price list generation unit superimposes, on the electric power price list, together with the prediction result of the electric power demand, electric power required for operating a target electric device among the electronic devices in the user's home for which the operating time can be shifted, an operating time that the target electronic device is to be operated, and information indicating the target electronic device as a two-dimensional diagram.

Accordingly, the user can comprehend the electric power required for operating a target electric device for which the operating time can be shifted, the operating time that the target electronic device is to be operated, and the target electronic device by confirming the generated electric power price list, and additionally comprehend the consequent used electric power price when the operating time is shifted, and the user can thereby shift the operating time of the target electronic device to the intended time.

Moreover, as an example of the foregoing information processing apparatus, when the operating time of the target electronic device is changed, the electric power price list generation unit superimposes, on the electric power price list, together with the prediction result of the electric power demand, information indicating the changed operating time of the target electronic device.

According to the foregoing configuration, when the operating time of the target electronic device is changed, the electric power price list generation unit superimposes, on the electric power price list, together with the prediction result of the electric power demand, information indicating the changed operating time of the target electronic device.

Accordingly, the user can confirm the changed operating time of the target electronic device, and confirm the price of the electric power used by the target electronic device.

Moreover, as an example of the foregoing information processing apparatus, the electric power price list generation unit indicates, for each time block that is more detailed than the predetermined time block, an electric power price of a portion of the electric power price list corresponding to the prediction result of the electric power demand.

According to the foregoing configuration, since the electric power price list generation unit indicates, for each time block that is more detailed than the predetermined time block, an electric power price of a portion of the electric power price list corresponding to the prediction result of the electric power demand, it is possible to improve the prediction accuracy of the used electric power price when the operating time of the target electronic device, in which the operating time thereof can be shifted, is shifted.

Moreover, as an example of the foregoing information processing apparatus, the electric power price list generation unit indicates the electric power purchase price on the electric power price list with regard to a time block in which the power generator does not generate power and a time block in which the electric storage device does not discharge, and indicates, on the electric power price list and with regard to a time block in which either the power generator or the electric storage device operates, a least expensive electric power price of either the electric power of the operating device or the electric power supplied from the commercial power source, based on the electric power generation of the power generator predicted by the electric power generation prediction unit and the operation plan of the electric storage device generated by the operation plan generation unit.

According to the foregoing configuration, it is possible to indicate the electric power purchase price on the electric power price list with regard to a time block in which the power generator does not generate power and a time block in which the electric storage device does not discharge, and indicate, on the electric power price list and with regard to a time block in which either the power generator or the electric storage device operates, a least expensive electric power price of either the electric power of the operating device or the electric power supplied from the commercial power source.

Moreover, as an example of the foregoing information processing apparatus, the electric power price list generation unit generates the electric power price list that classifies the electric power purchase price, the generated power price, and the stored power price with different colors, respectively.

According to the foregoing configuration, an electric power price list that classifies the electric power purchase price, the generated power price, and the stored power price is generated by different colors, respectively.

Accordingly, since the electric power purchase price, the electric power price upon using the electric power generated by the power generator, and the electric power price upon using the electric power stored in the electric storage device are displayed with different colors, respectively, it is possible to improve the user's visibility.

Moreover, as an example of the foregoing information processing apparatus, the information processing apparatus further comprises a sending unit for sending, to a device including a display unit, the electric power price list generated by the electric power price list generation unit.

According to the foregoing configuration, since the electric power price list is sent to a device including a display unit, the electric power price list can be confirmed at a location away from the information processing apparatus.

Moreover, as an example of the foregoing information processing apparatus, the information processing apparatus further comprises a display unit for displaying the electric power price list generated by the electric power price list generation unit.

According to the foregoing configuration, since the display unit displays the electric power price list generated by the electric power price list generation unit, the user can confirm the electric power price list.

The method for generating an electric power price list according to an embodiment of the present invention comprises a step of acquiring information related to an electric power purchase price, which is an electricity cost when an electronic device is operated using electric power supplied from a commercial power source, a step of determining, for each time block, a generated power price which is an electricity cost when an electronic device is operated using generated power of a power generator for generating power using natural energy, and a stored power price which is an electricity cost when an electronic device is operated using electric power stored in an electric storage device, and a step of generating an electric power price list capable of displaying, with regard to an arbitrary time block, the electric power purchase price, the generated power price and the stored power price.

The information processing system according to an embodiment of the present invention comprises an information processing apparatus, and a display device communicably connected to the information processing apparatus via a network, wherein the information processing apparatus includes an acquisition unit for acquiring information related to an electric power purchase price, which is an electricity cost when an electronic device is operated using electric power supplied from a commercial power source, a price determination unit for determining, for each time block, a generated power price which is an electricity cost when an electronic device is operated using generated power of a power generator for generating power using natural energy, and a stored power price which is an electricity cost when an electronic device is operated using electric power stored in an electric storage device, an electric power price list generation unit for generating an electric power price list capable of displaying, with regard to an arbitrary time block, the electric power purchase price, the generated power price and the stored power price, and a sending unit for sending, to the display device and via the network, the electric power price list generated by the electric power price list generation unit, and the display device includes a receiving unit for receiving the electric power price list via the network, and a display unit for displaying the electric power price list generated by the electric power price list generation unit.

The display device according to an embodiment of the present invention is a display device communicably connected via a network to an information processing apparatus including: an acquisition unit for acquiring information related to an electric power purchase price, which is an electricity cost when an electronic device is operated using electric power supplied from a commercial power source; a price determination unit for determining, for each time block, a generated power price which is an electricity cost when an electronic device is operated using generated power of a power generator for generating power using natural energy, and a stored power price which is an electricity cost when an electronic device is operated using electric power stored in an electric storage device; and an electric power price list generation unit for generating an electric power price list capable of displaying, with regard to an arbitrary time block, the electric power purchase price, the generated power price and the stored power price, wherein the display device comprises a receiving unit for receiving the electric power price list via the network, and a display unit for displaying the electric power price list received by the receiving unit.

According to the foregoing configuration, since an electric power price list capable of displaying, with regard to an arbitrary time block, an electric power purchase price, which is an electricity cost when an electronic device is operated using electric power supplied from a commercial power source, a generated power price which is an electricity cost when an electronic device is operated using generated power of a power generator for generating power using natural energy, and a stored power price which is an electricity cost when an electronic device is operated using electric power stored in an electric storage device is displayed, the user can comprehend the time block in which the electricity cost can be further reduced by confirming the generated electric power price list. Thus, it is possible to generate an electric power price list capable of achieving both user's convenience and user's profit.

Moreover, as an example of the foregoing display device, the display device further comprises an input unit for accepting an input on which electric power to use among the electric power from the commercial power source, the electric power of the power generator, and the electric power of the electric storage device with regard to each time block from the electric power price list displayed on the display unit, and a sending unit for sending, via the network, a notification signal for notifying the information processing apparatus of use of the electric power designated with the input unit.

According to the foregoing configuration, since an input on which electric power to use among the electric power from the commercial power source, the electric power of the power generator, and the electric power of the electric storage device with regard to each time block is accepted from the displayed electric power price list, the user can use the electric power in which the electricity cost can be further reduced.

Moreover, as an example of the foregoing display device, the input unit detects which electric power to use based on a user's operation of a touch panel.

According to the foregoing configuration, since which electric power to use is detected based on a user's operation of a touch panel, the user can easily select which electric power to use among the commercial power source, the power generator, and the electric storage device with regard to each time block from the displayed electric power price list.

Moreover, as an example of the foregoing display device, the input unit detects which electric power to use by receiving an external signal sent from an external remote controller.

According to the foregoing configuration, since which electric power to use is detected by receiving an external signal sent from an external remote controller, the user can easily select which electric power to use among the commercial power source, the power generator, and the electric storage device with regard to each time block from the displayed electric power price list.

Note that the specific embodiments or examples that were described in the section of Description of Embodiments are merely provided for clarifying the technical contents of the present invention, and the present invention should not be narrowly interpreted by being limited to such specific embodiments or examples, and may be variously modified and implemented within the scope of the spirit and claims of the present invention.

INDUSTRIAL APPLICABILITY

The information processing apparatus, the method for generating an electric power price list, the information processing system and the display device according to the present invention are effective as an information processing apparatus, a method for generating an electric power price list, an information processing system and a display device capable of generating an electric power price list capable of achieving both user's convenience and user's profit, and generating an electric power price list for displaying an electric power price when electric power supplied from a commercial power source is used, an electric power price when electric power generated by a power generator is used, and an electric power price when electric power stored in an electric storage device is used.

The invention claimed is:

1. An information processing apparatus, comprising:
an acquisition unit for acquiring information related to an electric power purchase price, which is an electricity cost when an electronic device is operated using electric power supplied from a commercial power source and a use history of electric power used by the electronic device in a user's home;
a demand prediction unit for predicting an electric power demand of the electronic device in the user's home by using the use history acquired by the acquisition unit;
a price determination unit for determining, for each time block, a generated power price which is an electricity cost when an electronic device is operated using generated power of a power generator for generating power using natural energy, and a stored power price which is an electricity cost when an electronic device is operated using electric power stored in an electric storage device;
an electric power price list generation unit for generating an electric power price list capable of displaying, with regard to an arbitrary time block, the electric power purchase price, the generated power price and the stored power price;
a control unit for sending a control signal that controls the operation of the electronic device; and
a display unit that displays the electric power price list generated by the electric power price list generation unit,
wherein the electric power price list including a plurality of time blocks along a lateral axis which represents a predetermined time period, a plurality of electric energy intervals along a vertical axis which represents a predetermined electric power usage, and a plurality of prices of power usage for each of the time blocks, the plurality of prices being among the electric power purchase prices acquired by the acquisition unit, the generated power prices determined by the price determination unit and the stored power prices determined by the price determination unit, and each of the plurality of prices being assigned a position in each time block and corresponding to one of the plurality of electric energy intervals on the electric power price list,
the electric power price list generation unit superimposes, on the electric power price list, a prediction result of the electric power demand of the electronic device in the user's home predicted by the demand prediction unit,
the electric power price list generation unit superimposes, on the electric power price list, together with the prediction result of the electric power demand, an operating change region that indicates an operating time and an electric power usage of the electronic device for which the operating time is changeable and which is among a plurality of electronic devices in the user's home,
when the operating change region corresponding to the electronic device for which the operating time is to be changed is selected by the user and the selected operating change region is moved on the display unit to an intended position by the user, the electric power price list generation unit moves the operating change region along a line indicating the prediction result of the electric power demand and superimposes, on the electric power price list, the moved operating change region together with an updated prediction result of the electric power demand based on the movement of the operating change region, and
when the operating change region corresponding to the electronic device for which the operating time is to be changed is selected by the user and the selected operating change region is moved to the intended position by the user, the control unit outputs a control signal to the electronic device for changing an operating time of the electronic device based on the movement of the operating change region.

2. The information processing apparatus according to claim 1, wherein
the acquisition unit additionally acquires an operating history of the power generator, and an operating history of the electric storage device,
the information processing apparatus further comprises:
an electric power generation prediction unit for predicting an electric power generation of the power generator by using the operating history of the power generator acquired by the acquisition unit; and
an operation plan generation unit for generating an operation plan of the electric storage device by using the operating history of the electric storage device acquired by the acquisition unit, and
the price determination unit includes:
a power generation price prediction unit for predicting the generated power price by using a predicted value of the electric power generation predicted by the electric power generation prediction unit; and
a power storage price prediction unit for predicting the stored power price based on the electric power purchase price acquired by the acquisition unit, the generated power price predicted by the power generation price prediction unit, and the operation plan of the electric storage device generated by the operation plan generation unit.

3. The information processing apparatus according to claim 2, wherein
the electric power price list generation unit indicates the electric power purchase price on the electric power price list with regard to a time block in which the power generator does not generate power and a time block in which the electric storage device does not discharge, and indicates, on the electric power price list and with regard to a time block in which either the power generator or the electric storage device operates, a least expensive electric power price of either the electric power of the operating device or the electric power supplied from the commercial power source, based on the electric power generation of the power generator predicted by the electric power generation prediction unit and the operation plan of the electric storage device generated by the operation plan generation unit.

4. The information processing apparatus according to claim 1, wherein
the electric power price list generation unit generates an electric power price list which indicates, for each predetermined time block, an electric power price in a case of preferentially using a less expensive electric power among the electric power supplied from the commercial power source, the electric power generated by the power generator, and the electric power stored in the electric storage device.

5. The information processing apparatus according to claim 1, wherein
the electric power price list generation unit indicates, for each time block that is more detailed than the predetermined time block, an electric power price of a portion of the electric power price list corresponding to the prediction result of the electric power demand.

6. The information processing apparatus according to claim 1, wherein
the electric power price list generation unit generates the electric power price list that classifies the electric power purchase price, the generated power price, and the stored power price with different colors, respectively.

7. The information processing apparatus according to claim 1, further comprising:
a sending unit for sending, to a device including a display unit, the electric power price list generated by the electric power price list generation unit.

8. The information processing apparatus according to claim 1, wherein
the price determination unit determines the stored power price in accordance with the electric power purchase price, the generated power price, electric energy based on the electric power supplied from the commercial power source and stored in the storage device, and another electric energy based on the generated power of the power generator that is stored in the storage device.

9. A method for generating an electric power price list, comprising:
acquiring information related to an electric power purchase price, which is an electricity cost when an electronic device is operated using electric power supplied from a commercial power source and a use history of electric power used by the electronic device in a user's home;
predicting an electric power demand of the electronic device in the user's home by using the use history acquired;
determining, for each time block, a generated power price which is an electricity cost when an electronic device is operated using generated power of a power generator for generating power using natural energy, and a stored power price which is an electricity cost when an electronic device is operated using electric power stored in an electric storage device; and
generating an electric power price list capable of displaying, with regard to an arbitrary time block, the electric power purchase price, the generated power price and the stored power price,
wherein the electric power price list including a plurality of time blocks along a lateral axis which represents a predetermined time period, a plurality of electric energy intervals along a vertical axis which represents a predetermined electric power usage, and a plurality of prices of power usage for each of the time blocks, the plurality of prices being among the electric power purchase prices acquired by the acquisition unit, the generated power prices determined by the price determination unit and the stored power prices determined by the price determination unit, and each of the plurality of prices being assigned a position in each time block and corresponding to one of the plurality of electric energy intervals on the electric power price list, in the generating of electric power price list, a prediction result of the electric power demand of the electronic device in the user's home predicted is superimposed on the electric power price list,
in the generating of electric power price list, an operating change region that indicates an operating time and an electric power usage of the electronic device for which the operating time is changeable and which is among a plurality of electronic devices in the user's home is superimposed on the electric power price list together with the prediction result of the electric power demand,
when the operating change region corresponding to the electronic device for which the operating time is to be changed is selected by the user and the selected operating change region is moved to an intended position by the user, the operating change region is moved along a line indicating the prediction result of the electric power demand and the moved operating change region together with an updated prediction result of the electric power demand based on the movement of the operating change region is superimposed on the electric power price list together with an updated prediction result of the electric power demand based on the movement of the operating change region, and
when the operating change region corresponding to the electronic device for which the operating time is to be changed is selected by the user and the selected operating change region is moved to the intended position by the user, a control signal is output to the electronic device for changing an operating time of the electronic device based on the movement of the operating change region.

10. An information processing system comprising an information processing apparatus, and a display device communicably connected to the information processing apparatus via a network, wherein
the information processing apparatus includes:
an acquisition unit for acquiring information related to an electric power purchase price, which is an electricity cost when an electronic device is operated using electric power supplied from a commercial power source and a use history of electric power used by the electronic device in a user's home;
a demand prediction unit for predicting an electric power demand of the electronic device in the user's home by using the use history acquired by the acquisition unit;
a price determination unit for determining, for each time block, a generated power price which is an electricity cost when an electronic device is operated using generated power of a power generator for generating power using natural energy, and a stored power price which is an electricity cost when an electronic device is operated using electric power stored in an electric storage device;
an electric power price list generation unit for generating an electric power price list capable of displaying, with regard to an arbitrary time block, the electric power purchase price, the generated power price and the stored power price;
a control unit for sending a control signal that controls the operation of the electronic device,
the electric power price list including a plurality of time blocks along a lateral axis which represents a predetermined time period, a plurality of electric energy intervals along a vertical axis which represents a predetermined electric power usage, and a plurality of prices of power usage for each of the time blocks, the plurality of prices being among the electric power purchase prices acquired by the acquisition unit, the generated power prices determined by the price determination unit and the stored power prices determined by the price determination unit, and each of the plurality of prices being assigned a position in each time block and corresponding to one of the plurality of electric energy intervals on the electric power price list; and a sending unit for sending, to the display device and via the network, the electric power price list generated by the electric power price list generation unit, wherein the electric power price list generation unit superimposes, on the electric power price list, a prediction result of the electric power demand of the electronic device in the user's home predicted by the demand prediction unit, the electric power price list generation unit superimposes, on the electric power price list, together with the prediction result of the electric power demand, an operating change region that indicates an operating time and an electric power usage of the electronic device for which the operating time is changeable and which is among a plurality of electronic devices in the user's home, when the operating change region corresponding to the electronic device for which the operating time is to be changed is selected by the user and the selected operating change region is moved on the display device to an intended position by the user, the electric power price list generation unit moves the operating change region along a line indicating the prediction result of the electric power demand and superimposes, on the electric power price list, the moved operating change region together with an updated prediction result of the electric power demand based on the movement of the operating change region, when the operating change region corresponding to the electronic device for which the operating time is to be changed is selected by the user and the selected operating change region is moved to the intended position on the prediction result of the electric power demand by the user, the control unit sends a control signal to the electronic device for changing an operating time of the electronic device based on the movement of the operating change region, and the display device includes:

a receiving unit for receiving the electric power price list via the network;

a display unit for displaying the electric power price list generated by the electric power price list generation unit; and an operating time change acceptance unit for accepting the user's selection of the operating change region corresponding to the electronic device for which the operating time is to be changed, accepting the user's operation of moving the selected operating change region to the intended position on the prediction result of the electric power demand, and transmitting, to the information processing apparatus, operating schedule information that indicates an operating time having been changed according to the accepted user's operation.

11. A display device communicably connected via a network to an information processing apparatus including: an acquisition unit for acquiring information related to an electric power purchase price, which is an electricity cost when an electronic device is operated using electric power supplied from a commercial power source and a use history of electric power used by the electronic device in a user's home; a demand prediction unit for predicting an electric power demand of the electronic device in the user's home by using the use history acquired by the acquisition unit; a price determination unit for determining, for each time block, a generated power price which is an electricity cost when an electronic device is operated using generated power of a power generator for generating power using natural energy, and a stored power price which is an electricity cost when an electronic device is operated using electric power stored in an electric storage device; and an electric power price list generation unit for generating an electric power price list capable of displaying, with regard to an arbitrary time block, the electric power purchase price, the generated power price and the stored power price, the electric power price list including a plurality of time blocks along a lateral axis which represents a predetermined time period, a plurality of electric energy intervals along a vertical axis which represents a predetermined electric power usage, and a plurality of prices of power usage for each of the time blocks, the plurality of prices being among the electric power purchase prices acquired by the acquisition unit, the generated power prices determined by the price determination unit and the stored power prices determined by the price determination unit, and each of the plurality of prices being assigned a position in each time block and corresponding to one of the plurality of electric energy intervals on the electric power price list, the electric power price list generation unit superimposes, on the electric power price list, a prediction result of the electric power demand of the electronic device in the user's home predicted by the demand prediction unit, the electric power price list generation unit superimposes, on the electric power price list, together with the prediction result of the electric power demand, an operating change region that indicates an operating time and an electric power usage of the electronic device for which the operating time is changeable and which is among a plurality of electronic devices in the user's home, when the operating change region corresponding to the electronic device for which the operating time is to be changed is selected by the user and the selected operating change region is moved on the display device to an intended position by the user, the electric power price list generation unit moves the operating change region along a line indicating the prediction result of the electric power demand and superimposes, on the electric power price list, the moved operating change region together with an updated prediction result of the electric power demand based on the movement of the operating change region, when the operating change region corresponding to the electronic device for which the operating time is to be changed is selected by the user and the selected operating change region is moved to the intended position on the prediction result of the electric power demand by the user, a control signal is sent to the electronic device for changing an operating time of the electronic device based on the movement of the operating change region, and the display device comprises:

a receiving unit for receiving the electric power price list via the network; and a display unit for displaying the electric power price list received by the receiving unit; and an operating time change acceptance unit for accepting the user's selection of the operating change region corresponding to the electronic device for which the operating time is to be changed, accepting the user's operation of moving the selected operating change region to the intended position on the prediction result of the electric power demand, and transmitting, to the information processing apparatus, operating schedule information that indicates an operating time having been changed according to the accepted user's operation.

12. The display device according to claim 11, further comprising:

an input unit for accepting an input on which electric power to use among the electric power from the commercial power source, the electric power of the power generator, and the electric power of the electric storage device with regard to each time block from the electric power price list displayed on the display unit; and a sending unit for sending, via the network, a notification signal for notifying the information processing apparatus of use of the electric power designated with the input unit.

13. The display device according to claim 12, wherein the input unit detects which electric power to use based on a user's operation of a touch panel.

14. The display device according to claim 12, wherein the input unit detects which electric power to use by receiving an external signal sent from an external remote controller.

\* \* \* \* \*